(12) United States Patent
Young et al.

(10) Patent No.: US 9,531,005 B2
(45) Date of Patent: Dec. 27, 2016

(54) SYNERGISTIC MULTIPHASE HYDRIDE ALLOY

(71) Applicant: Ovonic Battery Company, Inc., Rochester Hills, MI (US)

(72) Inventors: Kwo-hsiung Young, Troy, MI (US); Benjamin Chao, Troy, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 643 days.

(21) Appl. No.: 13/926,134

(22) Filed: Jun. 25, 2013

(65) Prior Publication Data

US 2014/0374652 A1    Dec. 25, 2014

(51) Int. Cl.
*H01M 4/38* (2006.01)
*C22C 19/00* (2006.01)
*C22C 19/03* (2006.01)

(52) U.S. Cl.
CPC ............ *H01M 4/383* (2013.01); *C22C 19/007* (2013.01); *C22C 19/03* (2013.01)

(58) Field of Classification Search
CPC ........ H01M 4/383; C22C 19/03; C22C 19/007
See application file for complete search history.

(56) References Cited

U.S. PATENT DOCUMENTS

| 5,536,591 | A | 7/1996 | Fetcenko et al. |
| 6,210,498 | B1 | 4/2001 | Ovshinsky et al. |
| 6,261,517 | B1 | 7/2001 | Kaneko et al. |
| 2007/0259264 | A1* | 11/2007 | Sakai ............... C01B 3/0052 429/218.2 |
| 2009/0061316 | A1 | 3/2009 | Yoshida et al. |

FOREIGN PATENT DOCUMENTS

| JP | H10237563 A | 9/1998 |
| JP | 2011102433 A | 5/2011 |
| JP | 2012067357 A | 4/2012 |

OTHER PUBLICATIONS

International Search Report and Written Opinion for co-pending PCT Application No. PCT/US2014/044034 issued Oct. 27, 2014.

* cited by examiner

*Primary Examiner* — Peter F Godenschwager
(74) *Attorney, Agent, or Firm* — Dinsmore & Shohl LLP; Weston R. Gould

(57) ABSTRACT

A hydrogen storage alloy material includes a primary phase having an $AB_x$ type structure and a secondary phase having a $B_2$ structure that enhances the electrochemical properties of the alloy. The A component of the primary phase includes La and Ce, and the B component of the primary phase includes Ni, Co, Al, and Mn. The secondary phase may include Al, Mn, and Ni. Also disclosed are battery systems including the alloy material.

16 Claims, 23 Drawing Sheets

US 9,531,005 B2

SYNERGISTIC MULTIPHASE HYDRIDE ALLOY

FIELD OF THE INVENTION

This invention relates to alloy materials and methods for their fabrication. In particular, the invention relates to metal hydride alloy materials which are capable of absorbing and desorbing hydrogen. In particular, the invention relates to metal hydride alloy materials which include a primary phase and a secondary phase that operates to enhance the electrochemical properties of the alloy.

BACKGROUND OF THE INVENTION

As is known in the art, certain metal hydride alloy materials are capable of absorbing and desorbing hydrogen. These materials can be used as hydrogen storage media and/or as electrode materials for fuel cells and metal hydride batteries including metal hydride/air battery systems.

When an electrical potential is applied between the cathode and a metal hydride anode in a metal hydride cell, the negative electrode material (M) is charged by the electrochemical absorption of hydrogen and the electrochemical evolution of a hydroxyl ion; upon discharge, the stored hydrogen is released to form a water molecule and evolve an electron. The reactions that take place at the positive electrode of a nickel metal hydride cell are also reversible. Most metal hydride cells use a nickel hydroxide positive electrode. The following charge and discharge reactions take place at a nickel hydroxide positive electrode.

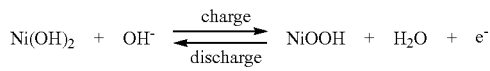

In a metal hydride cell having a nickel hydroxide positive electrode and a hydrogen storage negative electrode, the electrodes are typically separated by a non-woven, felted, nylon, or polypropylene separator. The electrolyte is usually an alkaline aqueous electrolyte, for example, 20 to 45 weight percent potassium hydroxide.

One particular group of metal hydride materials having utility in metal hydride battery systems is known as the $AB_x$ class of material with reference to the crystalline sites that its member component elements occupy. $AB_x$ type materials are disclosed, for example, in U.S. Pat. No. 5,536,591 and U.S. Pat. No. 6,210,498, the disclosures of which are incorporated herein by reference. Such materials may include, but are not limited to, modified $LaNi_5$ type as well as the TiVZrNi type active materials. These materials reversibly form hydrides in order to store hydrogen.

$AB_5$ hydride alloy materials, and in particular misch metal based $AB_5$ alloys, are one type of $AB_x$ material, and have been used extensively as electrode materials in nickel metal hydride (NiMH) batteries. The most commonly employed $AB_5$ alloy formulations are stoichiometric compositions including La, Ce, Pr, and Nd in the A-site and Ni, Co, Al, and Mn in the B-site. The preparation of such $AB_5$ alloy materials generally involves an annealing step which homogenizes the composition by eliminating any secondary phases which may have been formed in the preparation of these materials. The prior art teaches that the annealing process operates to flatten and lower the plateau region in the pressure-concentration-temperature (PCT) isotherm of the materials and thereby increases the material's reversible hydrogen storage capacity, electrochemical discharge capacity, and grain size. It has further been found that the increase in grain size in general improves cycle stability but decreases high-rate dischargeability.

The present invention breaks with the prior art and recognizes that presence of a secondary phase in an $AB_5$ material acts to improve the electrochemical properties of the bulk alloy, for example by improving capacity and/or high-rate discharge. Furthermore, it has been found that the alloys of the present invention may be prepared from metal mixtures which do not include high-priced components such as Pr or Nd. These and other advantages of the invention will be apparent from the drawings, discussion, and description which follow.

BRIEF DESCRIPTION OF THE INVENTION

Disclosed is an $AB_x$ type hydrogen storage alloy wherein x is in the range of 1-6. The alloy is comprised of a primary phase and further includes a secondary phase that enhances the electrochemical properties of the alloy by improving at least one of capacity or high-rate discharge, as compared to an alloy of like composition not including the secondary phase. The alloys of the present invention may be further characterized in that they do not include any Pr or Nd. In particular instances, the alloy is an $AB_5$ type alloy, and in such instance the primary phase may have a $CaCu_5$ crystalline structure. In other embodiments, the primary phase is selected from the group consisting of: $AB_3$, $A_2B_7$, $A_5B_{19}$, and $AB_4$, wherein A is a combination of at least one alkaline earth element and at least one rare earth element and B is selected from the group consisting of: Al, Si, Sn, transition metals, and combinations thereof, and wherein said alloy contains no more than 10 atomic percent of said at least one alkaline earth element and more than 10 atomic percentage of said at least one rare earth element.

In particular instances, the A component of the primary phase is $La_{1-x}Ce_x$, in which x is greater than 0.33 and less than or equal to 0.66; and the B component of said primary phase includes at least Ni, Co, Al, and Mn, and wherein the primary phase has the composition $AB_{5+y}$, wherein y is in the range of −1 to 0.9. In some specific instances, the B component of the primary phase may further include at least one or more of Cu, Si, or Zr.

In certain embodiments of the invention, the secondary phase comprises at least Al, Mn, and Ni. In particular instances, the secondary phase has a $B_2$ structure. In some embodiments of the present invention the secondary phase comprises, on a volume basis, 1-15% of the alloy, and in particular instances 2-10% of the alloy.

Particular alloys of the present invention are characterized in that when the raw materials comprising the alloy are mixed, melted, and allowed to solidify, they spontaneously form the primary and secondary phases. One particular alloy of the present invention is prepared from a bulk mixture comprising La, Ce, Ni, Co, Mn, Al, Cu, Si, and Zr.

DETAILED DESCRIPTION OF THE INVENTION

Figure 1A:
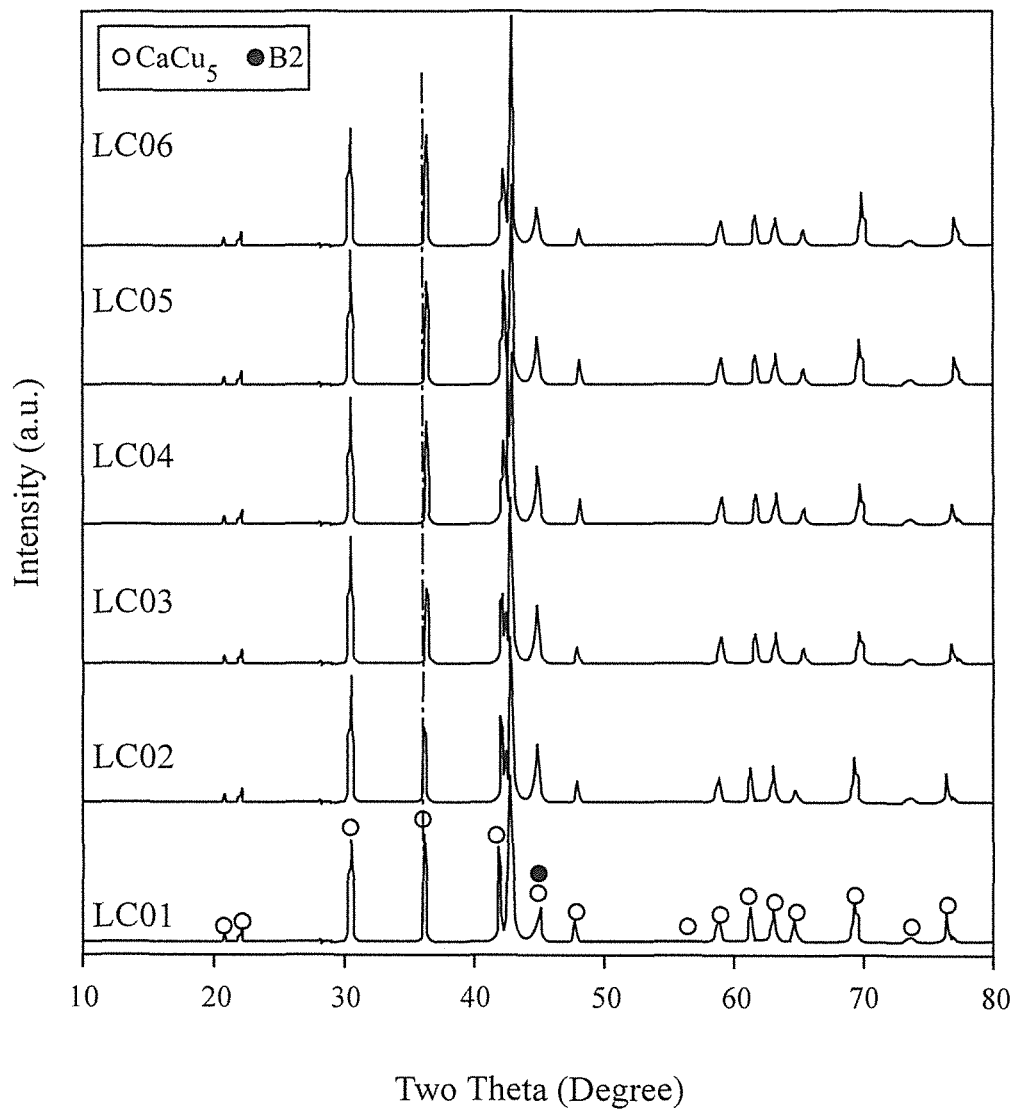
FIG. 1a shows the x-ray diffraction patterns prior to annealing and FIG. 1b shows the x-ray diffraction patterns for these alloys following annealing.

The present invention is directed to metal hydride alloy materials of the general type referred to as $AB_x$ alloy materials. In particular, the invention is directed to $AB_x$ alloy materials in which x is in the range of 1-6. In particular instances, the present invention is directed to alloys referred to as $AB_5$ materials. As is known in the art, such materials include a first component A, and a second component B which is present in an approximately five-fold greater atomic percentage than the first component. It is to be noted that while such materials are referred to as $AB_5$ materials, it is understood in the art that compositions may be off stoichiometric and still be considered to be $AB_5$ materials. In general, the $AB_5$ materials of the present invention can be understood to include materials of the formula $AB_{5+y}$ wherein y is in the range of −1 to 0.9. The materials of the present invention include a primary phase which has an $AB_5$ structure as described above. The material further includes a secondary phase which generally has a $B_2$ structure as is known in the art. The secondary phase may comprise, on a volume basis, approximately 1-15% of the alloy, and in particular instances 2-10% by volume of the alloy.

While the principles of the present invention will be described with reference to specific $AB_5$ type alloys, these principles may be applied to the more general class of multiphase $AB_x$ alloy materials. For example, one of skill in the art could, in view of the teaching presented herein identify and prepare multiphase alloys of the present invention having structures including, but not limited to $AB_3$, $A_2B_7$, $A_5B_{19}$, and $AB_4$ structures.

Materials of the present invention demonstrate improved electrochemical properties, as compared to similar materials which do not include a secondary phase. In particular, the materials of the present invention demonstrate an improvement in overall capacity and/or high-rate discharge (HRD), both of which are important in battery applications. In specific instances, the alloy materials of thee present invention have a HRD which is at least 0.9, such as a HRD which is at least 0.95, such as a HRD of at least 0.97, such as a HRD of 0.98.

While not wishing to be bound by speculation, it is believed that presence of the secondary phase improves the hydrogen diffusion/transport characteristics of the alloy material by weakening the binding of hydrogen to the alloy material. In this regard, it is believed that the primary phase acts as a hydrogen storage phase material while the secondary phase readily absorbs and desorbs hydrogen so as to function as a buffer material which provides a hydrogen reservoir which aids in the transport of hydrogen to and from the bulk, primary phase. The secondary phase may comprise a series of discrete regions dispersed throughout the primary phase, or it may be present in the form of an interconnected network extending through the primary phase. Confirmation of the foregoing hypothesis is suggested by the fact, as will be described hereinbelow, that when the materials of the present invention are annealed so as to remove the secondary phase, the improvements in electrochemical properties are reduced.

The primary phase of one group of materials of the present invention is an $AB_5$ type material in which the A component of the primary phase is based upon La and Ce in proportion such that the composition of the A component is generally $La_{1-x}Ce_x$, in which x is greater than 0.33 and less than or equal to 0.66. The B component of the primary phase typically includes at least Ni, Co, Al, and Mn. The overall composition of the first component is given by the formula $AB_{5+y}$ wherein y is in the range of −1 to 0.9. In particular instances, the B component of the primary phase may include additional components such as one or more of Cu, Si, or Zr. Yet other compositions will be apparent to those of skill in the art and are within the scope of this invention.

The secondary phase of this material of the present invention generally has a $B_2$ structure and can include at least Al, Mn, and Ni. One particular group of alloys of the present invention is defined by the formula $La_{15-x}Ce_xNi_{68.7}Co_{4.7}Mn_{4.3}Al_{5.6}Cu_{1.2}Zr_{0.2}Si_{0.3}$, wherein x is in the range of 5-10.

Experimental

An experimental series was carried out in which a group of $AB_5$ type alloy materials of the present invention was prepared, and their physical and electrochemical properties were determined.

In this study, a series of sample ingots were prepared by induction melting performed under an argon atmosphere in a 2 kg furnace using a MgO crucible, an alumina tundish, and a steel pancake-shape mold. The annealing of ingots was done in vacuum ($1\times10^{-8}$ torr) at 960° C. for 10 h. The chemical composition of each sample was examined by a Varian Liberty 100 inductively-coupled plasma (ICP) system. A Philips X'Pert Pro x-ray diffractometer (XRD) was used to study the microstructure, and a JEOL-JSM6320F scanning electron microscope (SEM) with energy dispersive spectroscopy (EDS) capability was used to study the phase distribution and composition. PCT characteristics for each sample were measured using a Suzuki-Shokan multi-channel PCT system. In the PCT analysis, each sample was first activated by performing 4 room temperature absorption/desorption cycles; PCT isotherms at 20, 30, and 60° C. were then measured. The hydrogen diffusion and surface charge-transfer current measurements were performed using an Arbin Instruments BT4+ Portable Battery Test System.

Six alloys with Ce partially substituting for La and having a general formulation of $AB_{5.7}$, $La_{15-x}Ce_xNi_{68.7}Co_{4.7}Mn_{4.3}Al_{5.6}Cu_{1.2}Zr_{0.2}Si_{0.3}$ (x=5, 6, 7, 8, 9, and 10) were prepared by induction melting, and their design compositions are listed in Table 1 below (LC01 to LC06). Besides the common B elements (Ni, Co, Mn, and Al), Cu was included to improve the low-temperature power performance due to its ability to modify the surface oxide by filling it with voids, tunnels, and metallic scrolls instead of regular granular-shape inclusions.

TABLE 1

Comparison of design composition and ICP result

| | | La | Ce | Ni | Co | Mn | Al | Cu | Si | Zr | Fe | B/A |
|---|---|---|---|---|---|---|---|---|---|---|---|---|
| LC01 | Design | 10.0 | 5.0 | 68.7 | 4.7 | 4.3 | 5.6 | 1.2 | 0.3 | 0.2 | 0.0 | 5.67 |
| | ICP as-cast | 10.1 | 5.1 | 68.7 | 4.8 | 4.4 | 5.4 | 1.2 | 0.0 | 0.2 | 0.0 | 5.57 |
| | ICP annealed | 10.2 | 5.1 | 69.2 | 4.8 | 4.0 | 5.3 | 1.2 | 0.0 | 0.2 | 0.0 | 5.54 |
| LC02 | Design | 9.0 | 6.0 | 68.7 | 4.7 | 4.3 | 5.6 | 1.2 | 0.3 | 0.2 | 0.0 | 5.67 |
| | ICP as-cast | 9.0 | 6.3 | 67.9 | 5.1 | 4.5 | 5.7 | 1.3 | 0.0 | 0.2 | 0.0 | 5.54 |
| | ICP annealed | 8.9 | 6.2 | 68.7 | 4.8 | 4.2 | 5.7 | 1.2 | 0.0 | 0.2 | 0.0 | 5.62 |
| LC03 | Design | 8.0 | 7.0 | 68.7 | 4.7 | 4.3 | 5.6 | 1.2 | 0.3 | 0.2 | 0.0 | 5.67 |
| | ICP as-cast | 8.0 | 7.1 | 68.5 | 4.9 | 4.4 | 5.6 | 1.2 | 0.0 | 0.2 | 0.0 | 5.62 |
| | ICP annealed | 8.0 | 7.1 | 68.9 | 4.9 | 4.2 | 5.4 | 1.2 | 0.0 | 0.2 | 0.0 | 5.62 |
| LC04 | Design | 7.0 | 8.0 | 68.7 | 4.7 | 4.3 | 5.6 | 1.2 | 0.3 | 0.2 | 0.0 | 5.67 |
| | ICP as-cast | 6.9 | 8.5 | 68.3 | 5.0 | 4.3 | 5.5 | 1.2 | 0.0 | 0.2 | 0.0 | 5.49 |
| | ICP annealed | 6.8 | 8.5 | 68.8 | 5.0 | 3.9 | 5.5 | 1.2 | 0.0 | 0.2 | 0.1 | 5.54 |
| LC05 | Design | 6.0 | 9.0 | 68.7 | 4.7 | 4.3 | 5.6 | 1.2 | 0.3 | 0.2 | 0.0 | 5.67 |
| | ICP as-cast | 6.1 | 9.1 | 68.3 | 4.9 | 4.5 | 5.6 | 1.2 | 0.0 | 0.2 | 0.1 | 5.58 |
| | ICP annealed | 6.1 | 9.0 | 68.9 | 4.9 | 4.2 | 5.5 | 1.2 | 0.0 | 0.2 | 0.1 | 5.63 |
| LC06 | Design | 5.0 | 10.0 | 68.7 | 4.7 | 4.3 | 5.6 | 1.2 | 0.3 | 0.2 | 0.0 | 5.67 |
| | ICP as-cast | 5.0 | 9.9 | 68.6 | 5.0 | 4.4 | 5.6 | 1.2 | 0.0 | 0.2 | 0.1 | 5.71 |
| | ICP annealed | 5.2 | 9.9 | 69.1 | 4.8 | 4.2 | 5.4 | 1.2 | 0.0 | 0.2 | 0.1 | 5.63 |

The ICP results of all six alloys before (as-cast) and after annealing (annealed), as listed in Table 1, are very close to the design compositions except for the content of Si, which cannot be analyzed with a standard ICP apparatus. Therefore, the existence of Si in the alloy was verified by EDS analysis. The very small amounts of Fe noted are believed to come from the cooling mold. There was also a small amount of Mn loss during the annealing process. The B/A stoichiometric ratios of design, as-cast, and annealed ingots are listed in the last column in Table 1. All the B/A ratios (5.49 to 5.63) are slightly lower than the design value of 5.67 except for that of as-cast LC06 (5.71).

Figure 1B:
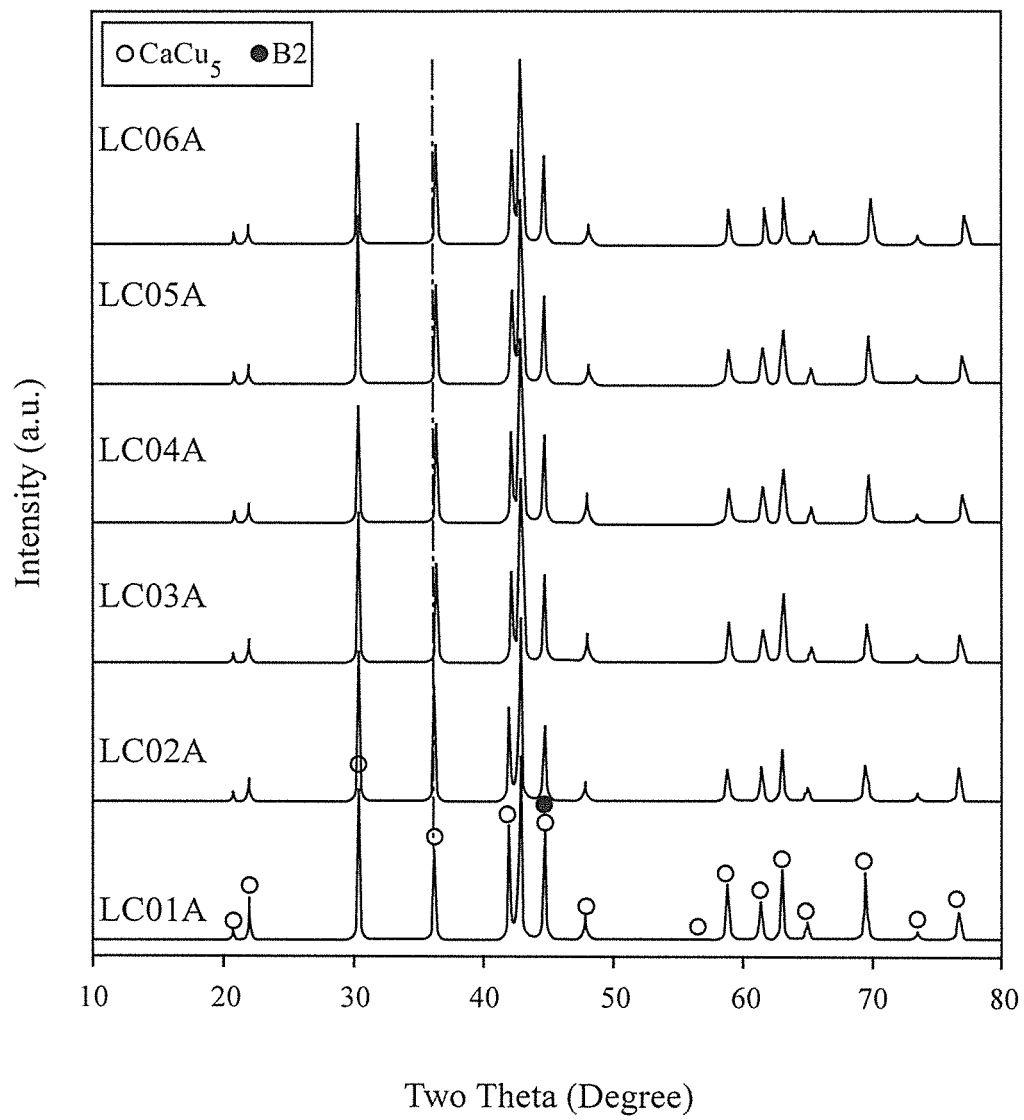

Structures of the materials were analyzed by X-Ray Diffraction (XRD), and the XRD patterns measured from the alloys before (LC01 to LC06) and after (LC01A to LC06A) annealing are shown in FIGS. 1a and 1b, respectively. All peaks can be fit into a $CaCu_5$ crystal structure. Since the (002) peak at around 45.5° is noticeably broader compared to the rest of the peaks in each of the XRD patterns, a secondary phase might be present in the microstructure. The existence of a secondary cubic phase was confirmed by whole-pattern fitting using Rietveld method. Furthermore, a secondary phase with the chemical stoichiometry of approximately $AlMnNi_2$ was observed by SEM/EDS examination. According to the ternary phase diagram, $Al_xMn_{2-x}Ni_2$ has a B2 structure over the entire range of x between 0 and 1. Therefore, it is reasonable to conclude that the main secondary phase in each alloy of the current study has a cubic B2 crystal structure.

Figure 2A:
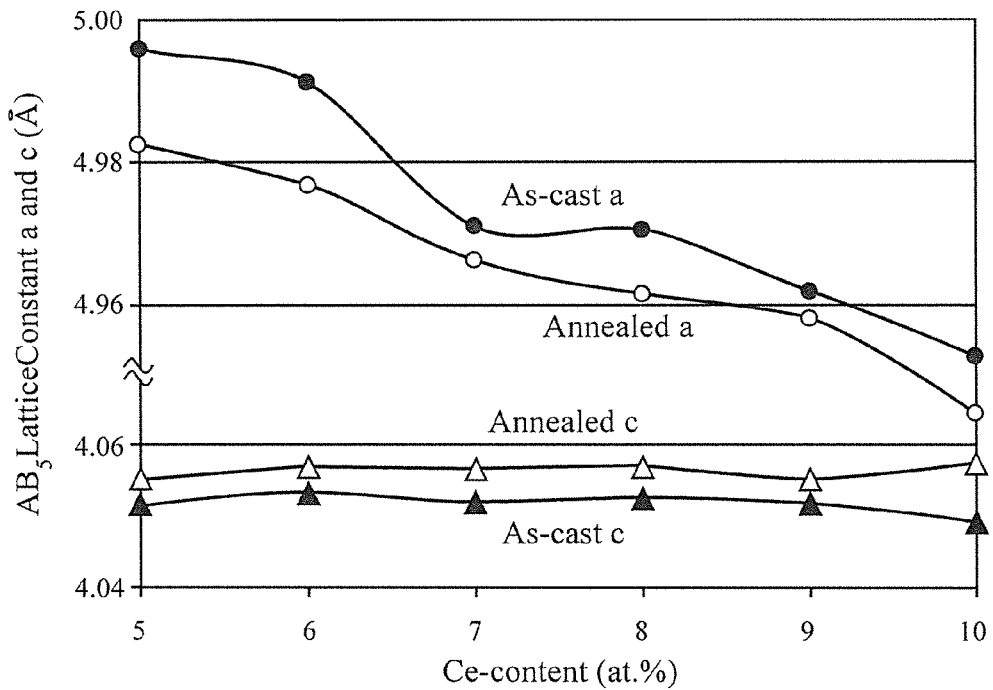
FIG. 2a shows a plot of the lattice constants a and c for a series of alloys, as a function of Ce content.
Figure 2B:
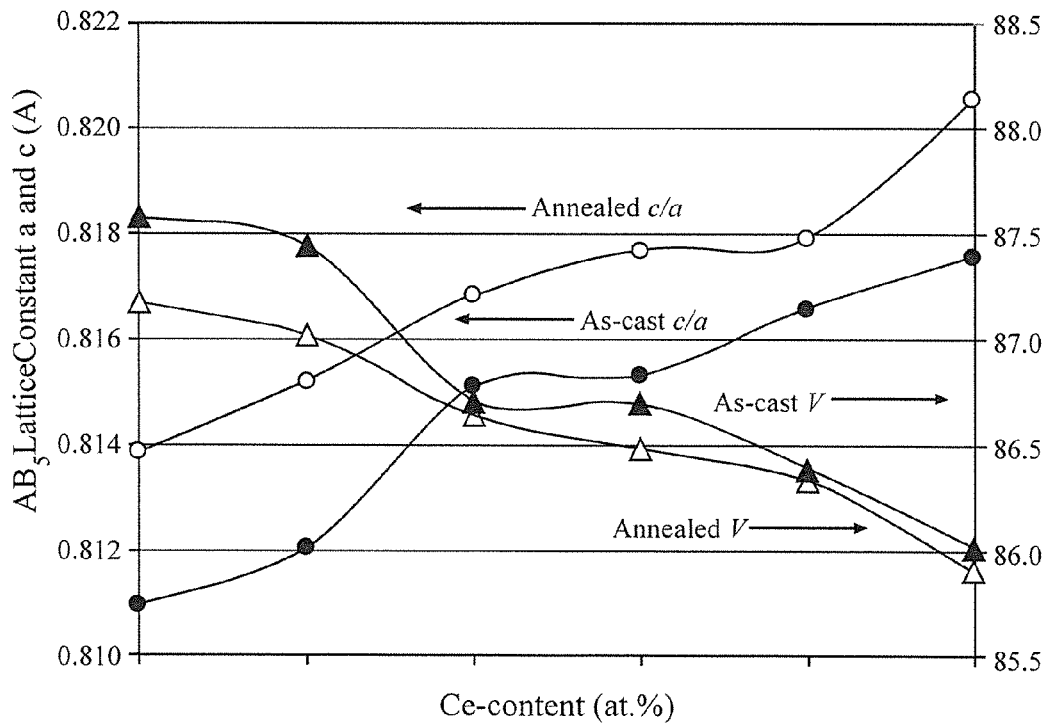
FIG. 2b shows a plot of the lattice constant ratio c/a as a function of Ce content for this group of alloys.
Figure 3A:
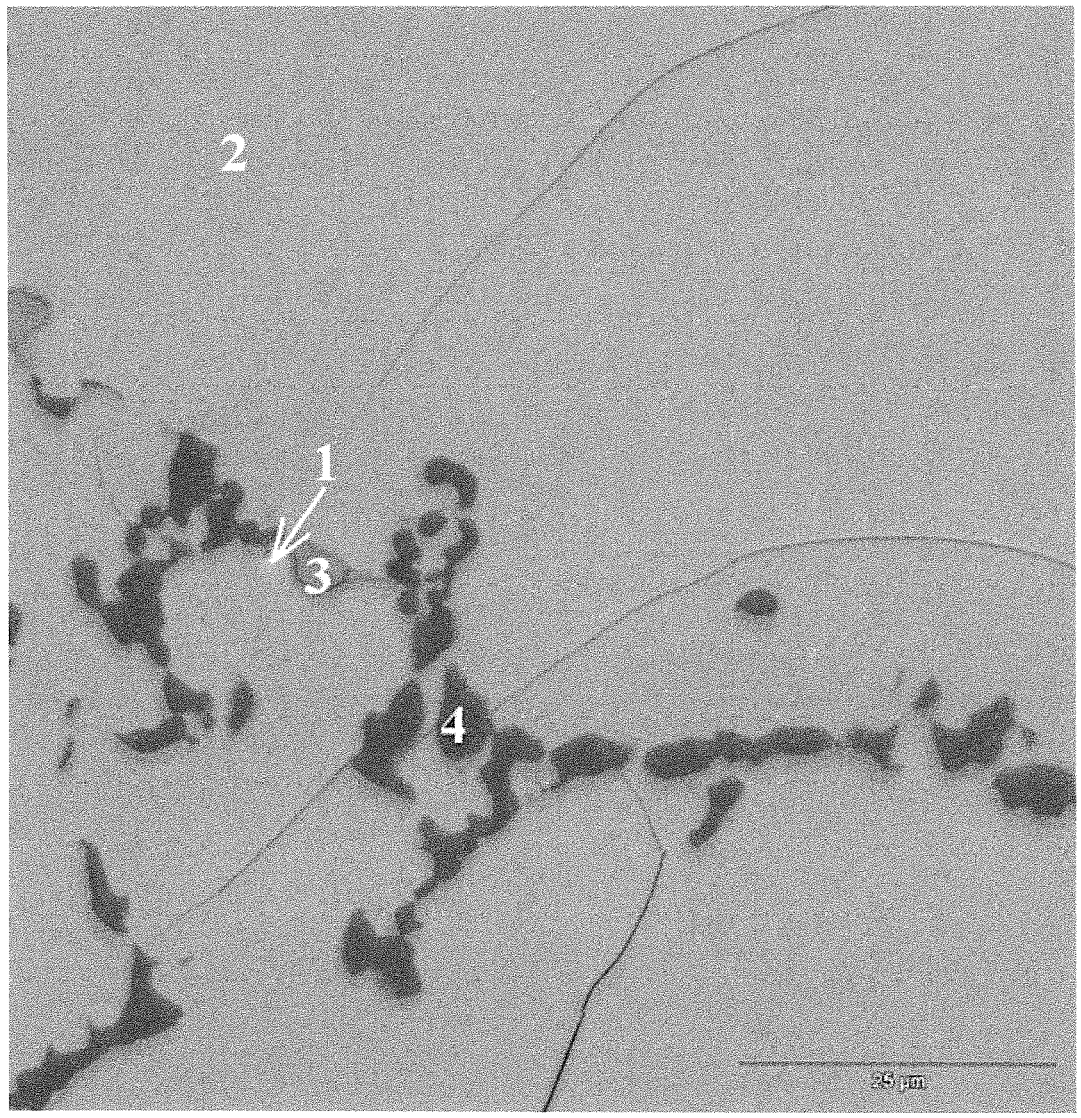
FIG. 3a is a SEM back-scattering electron image from the series of as-cast alloys of the present invention.
Figure 3B:
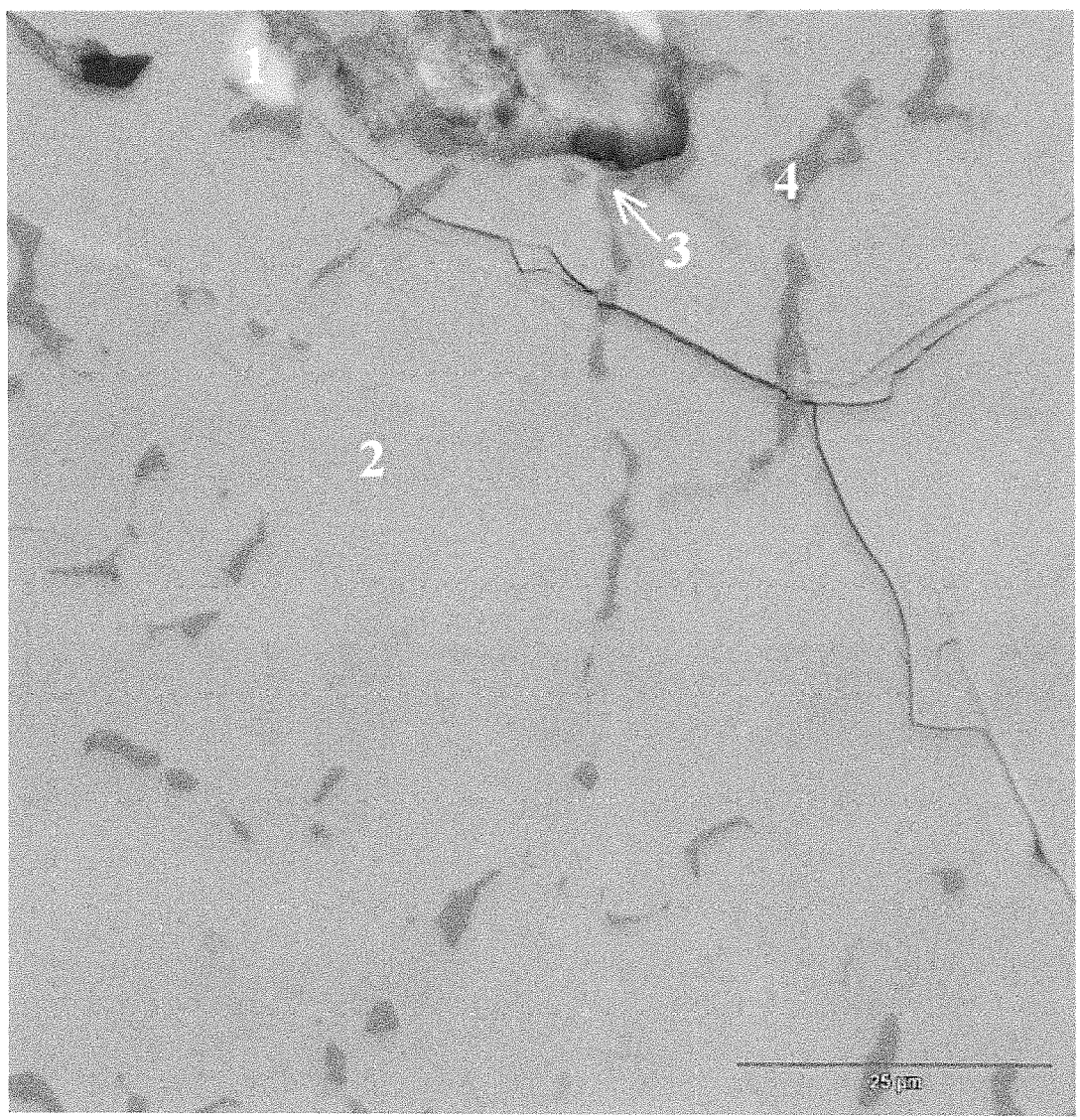
FIG. 3b is a SEM back-scattering electron image from the series of as-cast alloys of the present invention.
Figure 3C:
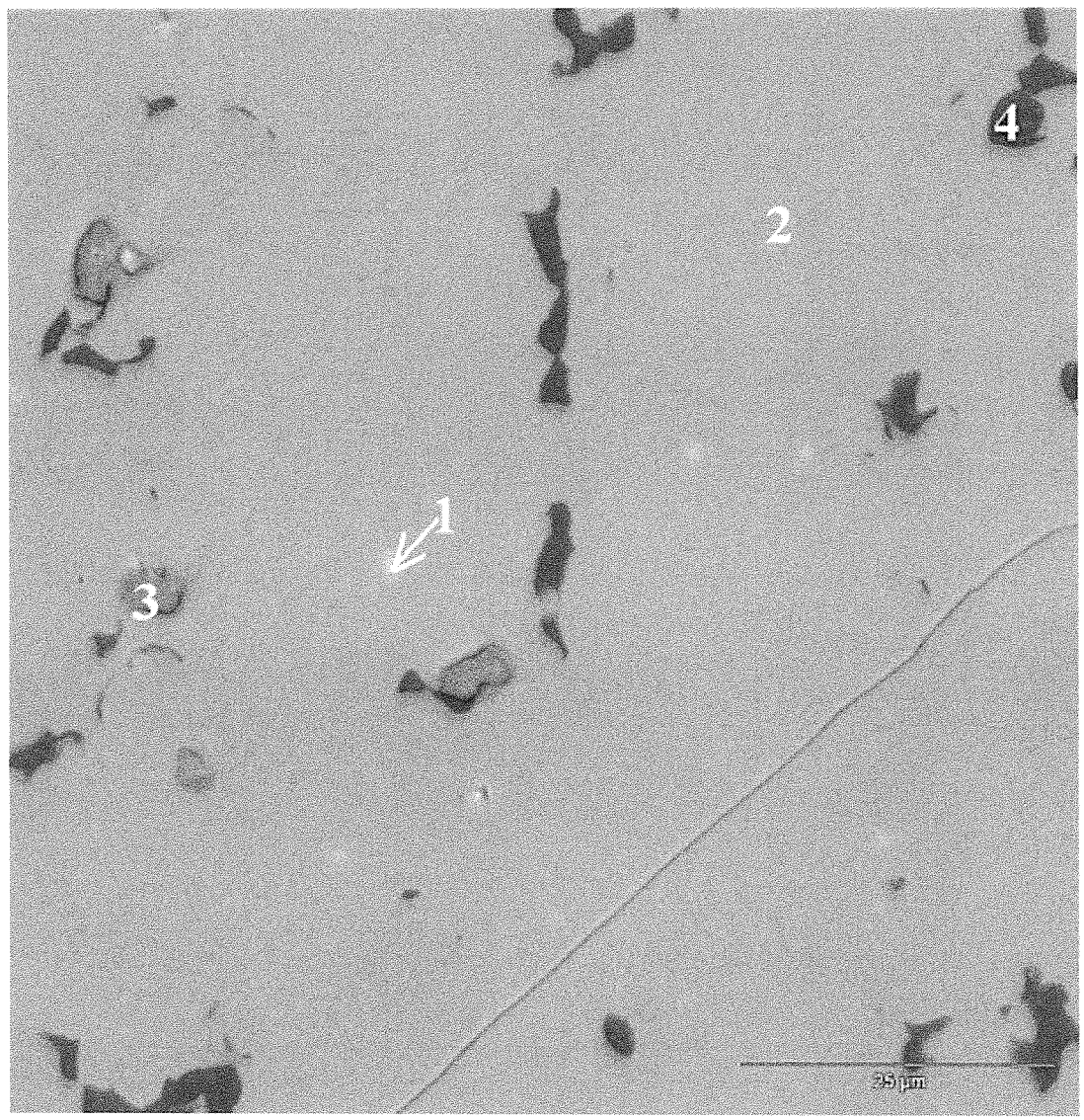
FIG. 3c is a SEM back-scattering electron image from the series of as-cast alloys of the present invention.
Figure 3D:
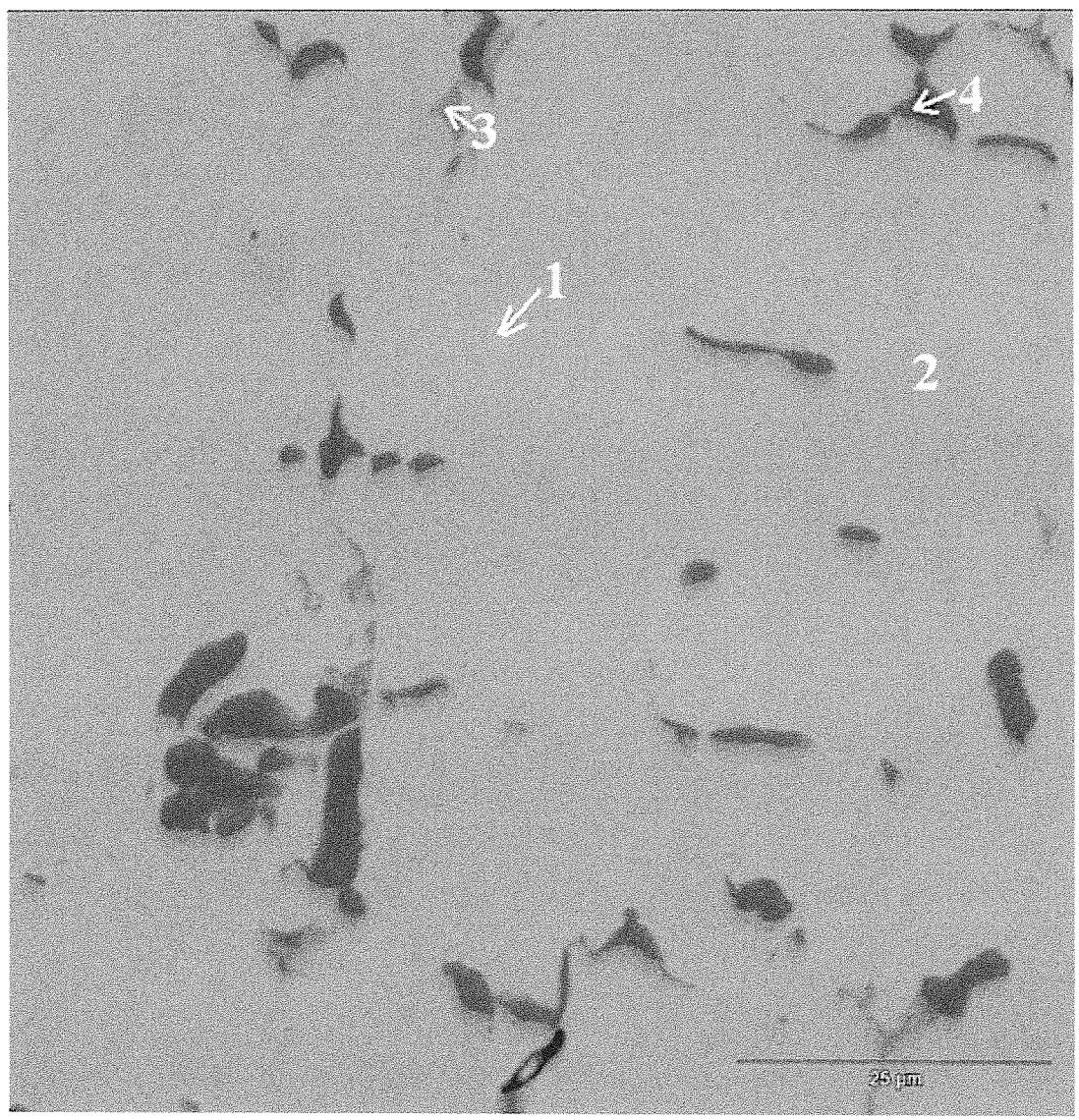
FIG. 3d is a SEM back-scattering electron image from the series of as-cast alloys of the present invention.
Figure 3E:
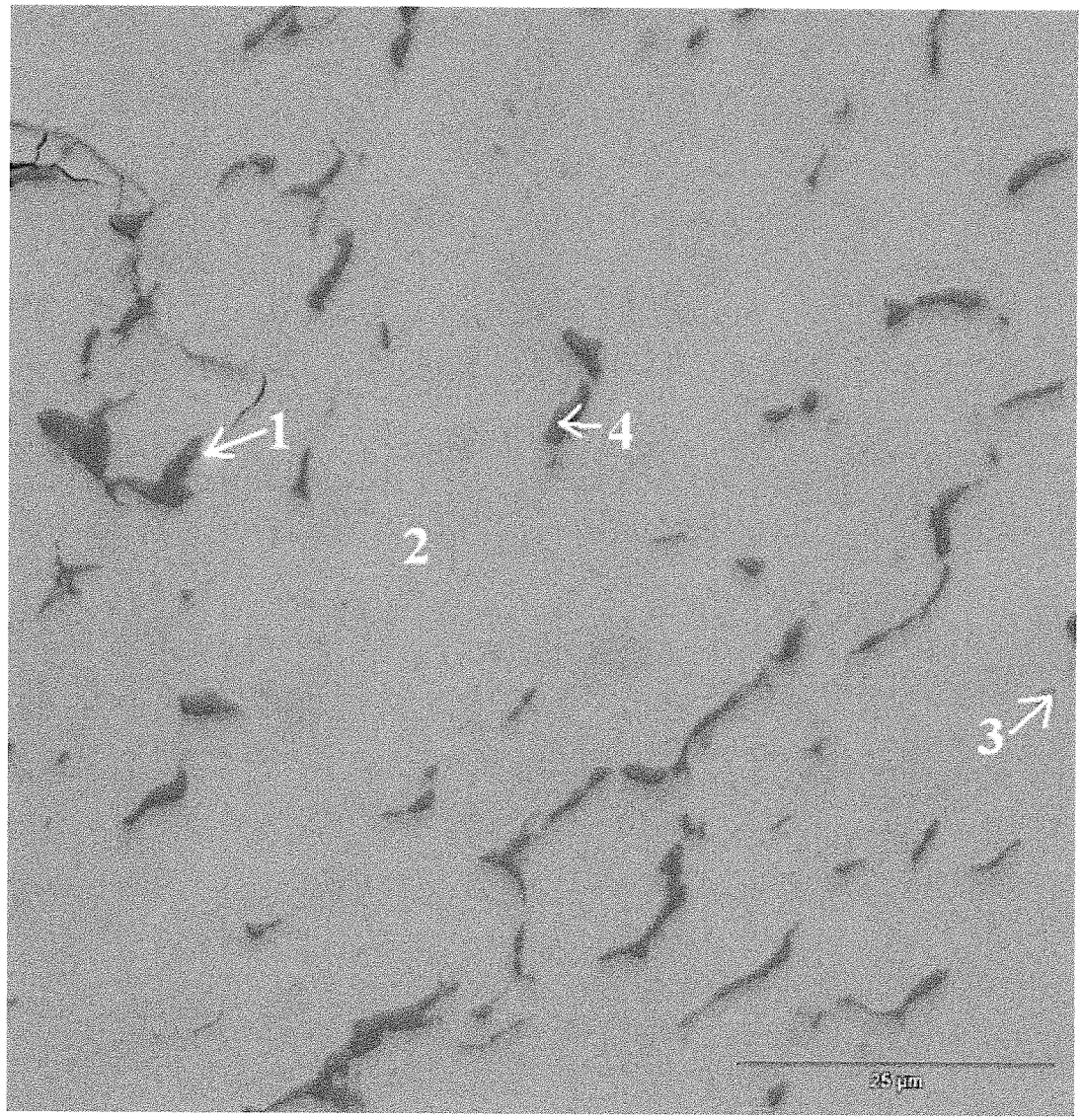
FIG. 3e is a SEM back-scattering electron image from the series of as-cast alloys of the present invention.
Figure 3F:
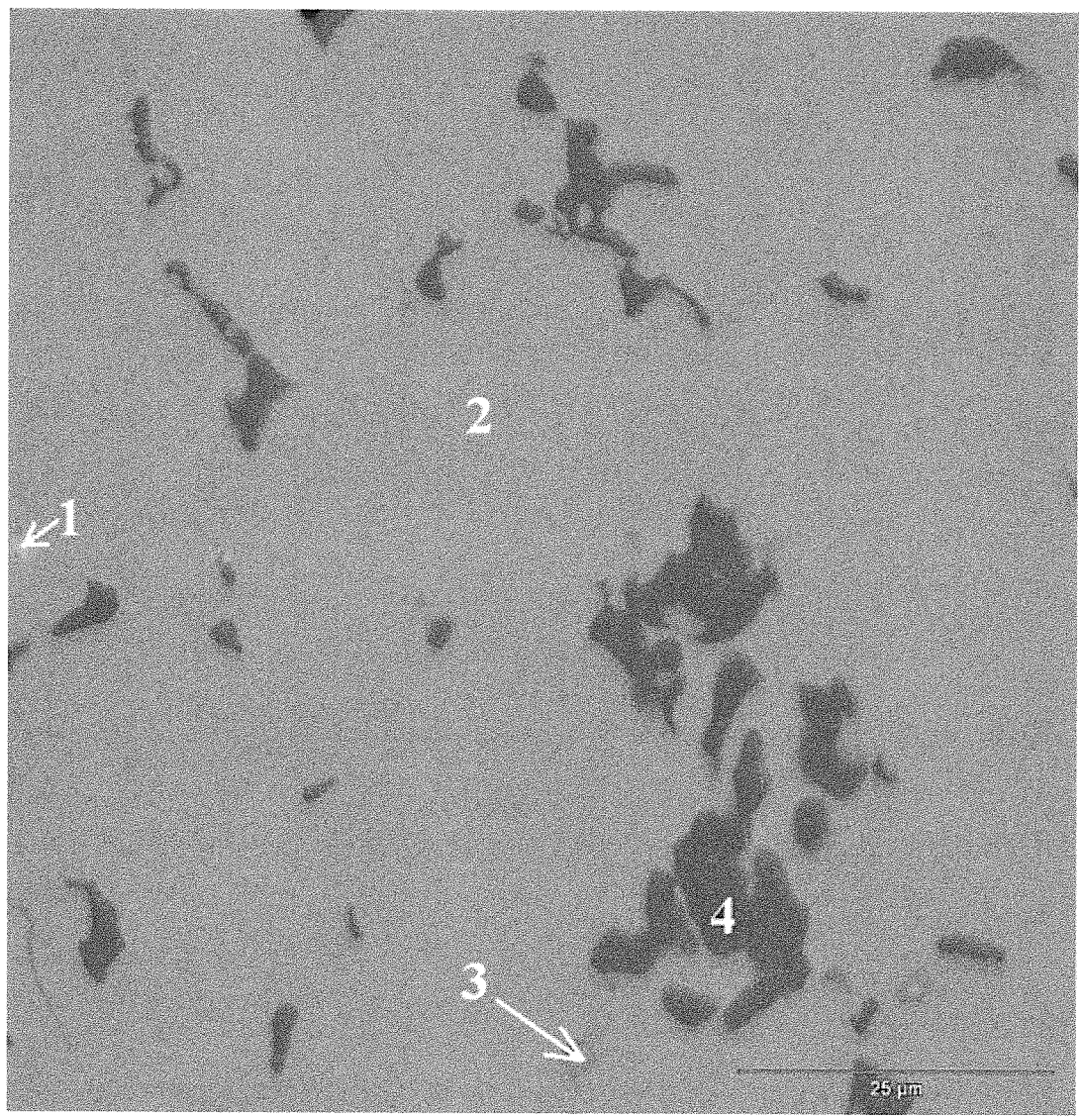
FIG. 3f is a SEM back-scattering electron image from the series of as-cast alloys of the present invention.
Figure 4A:
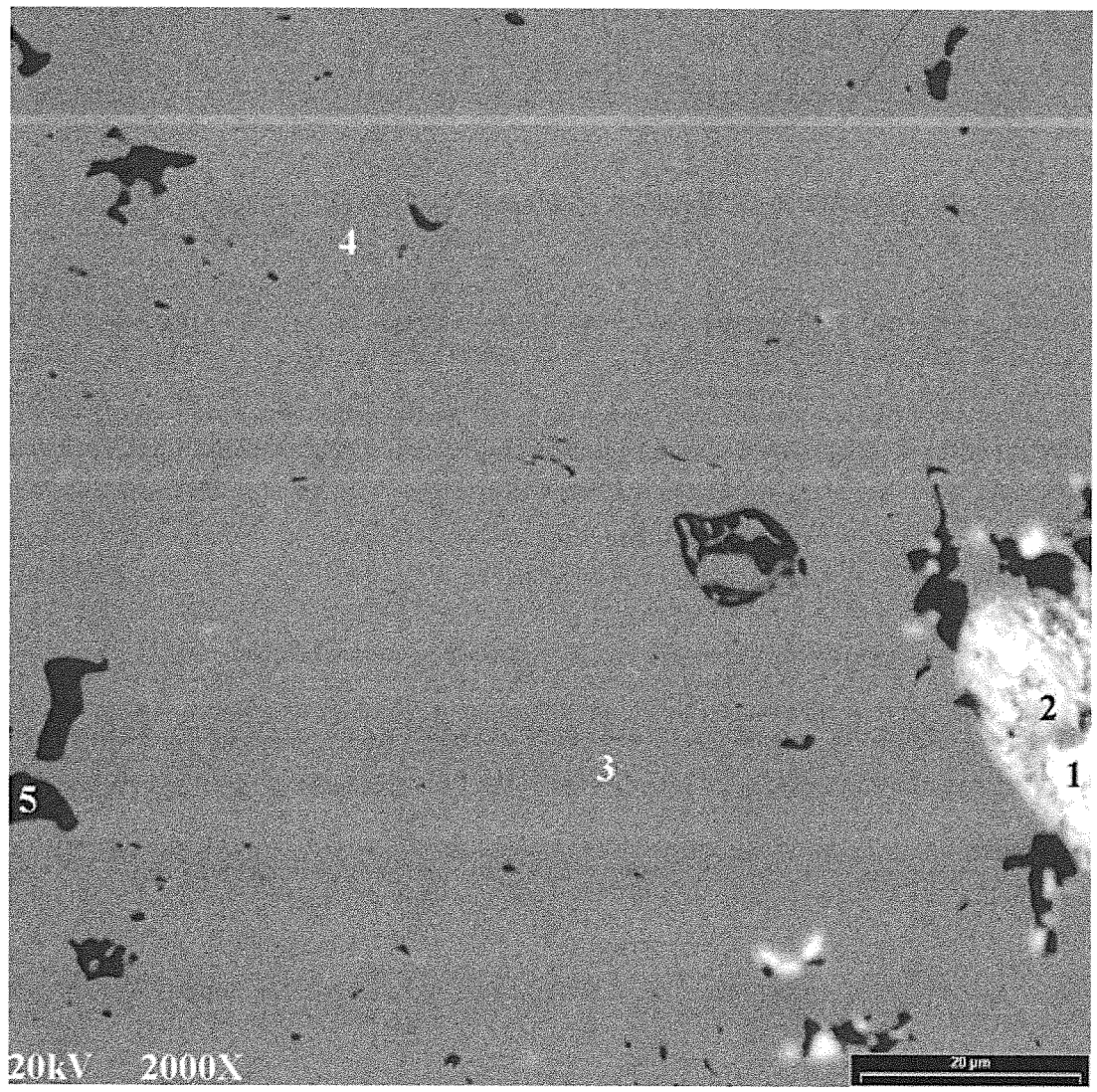
FIG. 4a is a SEM back-scattering electron image from the series of annealed alloys of the present invention.
Figure 4B:
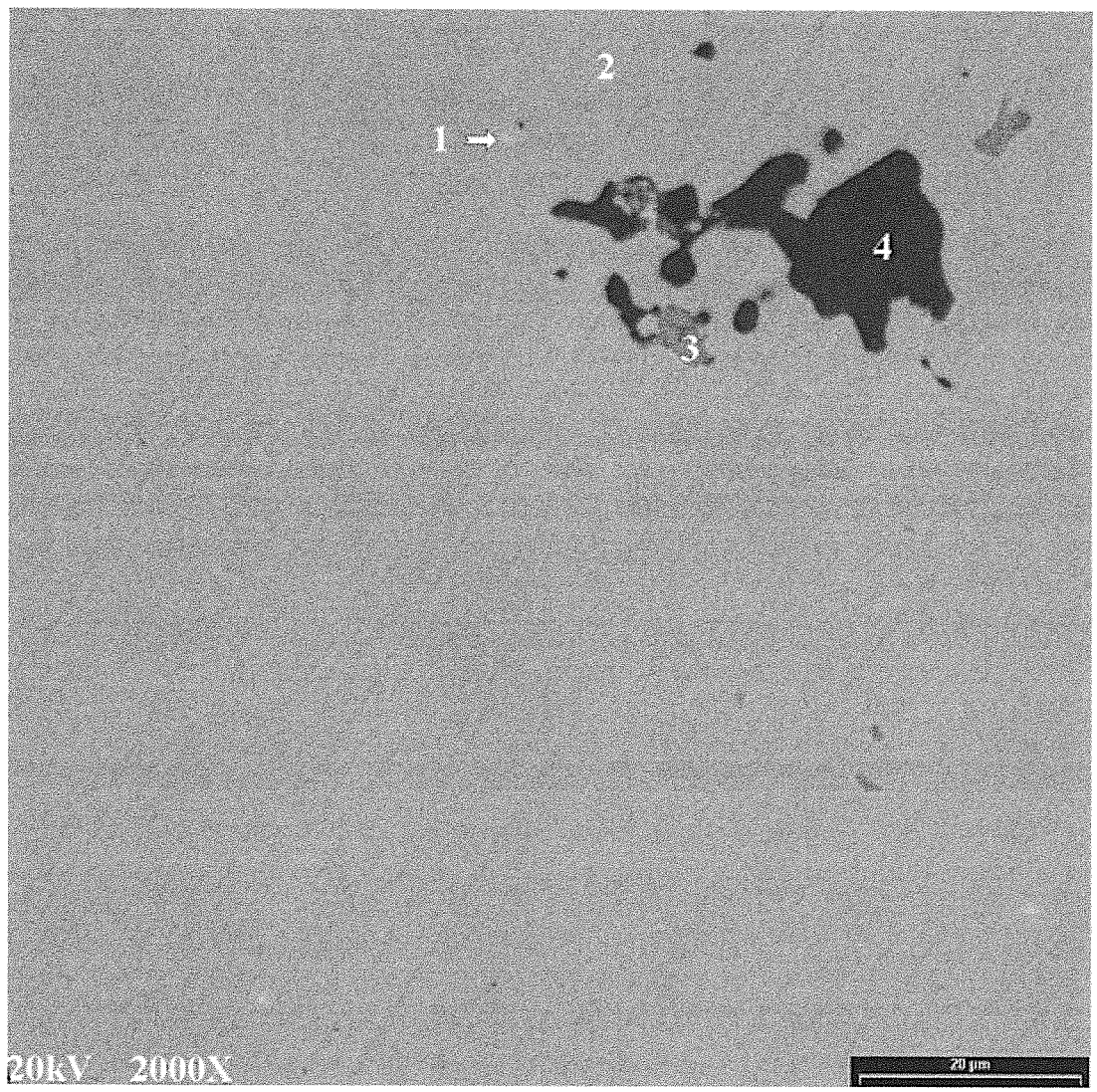
FIG. 4b is a SEM back-scattering electron image from the series of annealed alloys of the present invention.
Figure 4C:
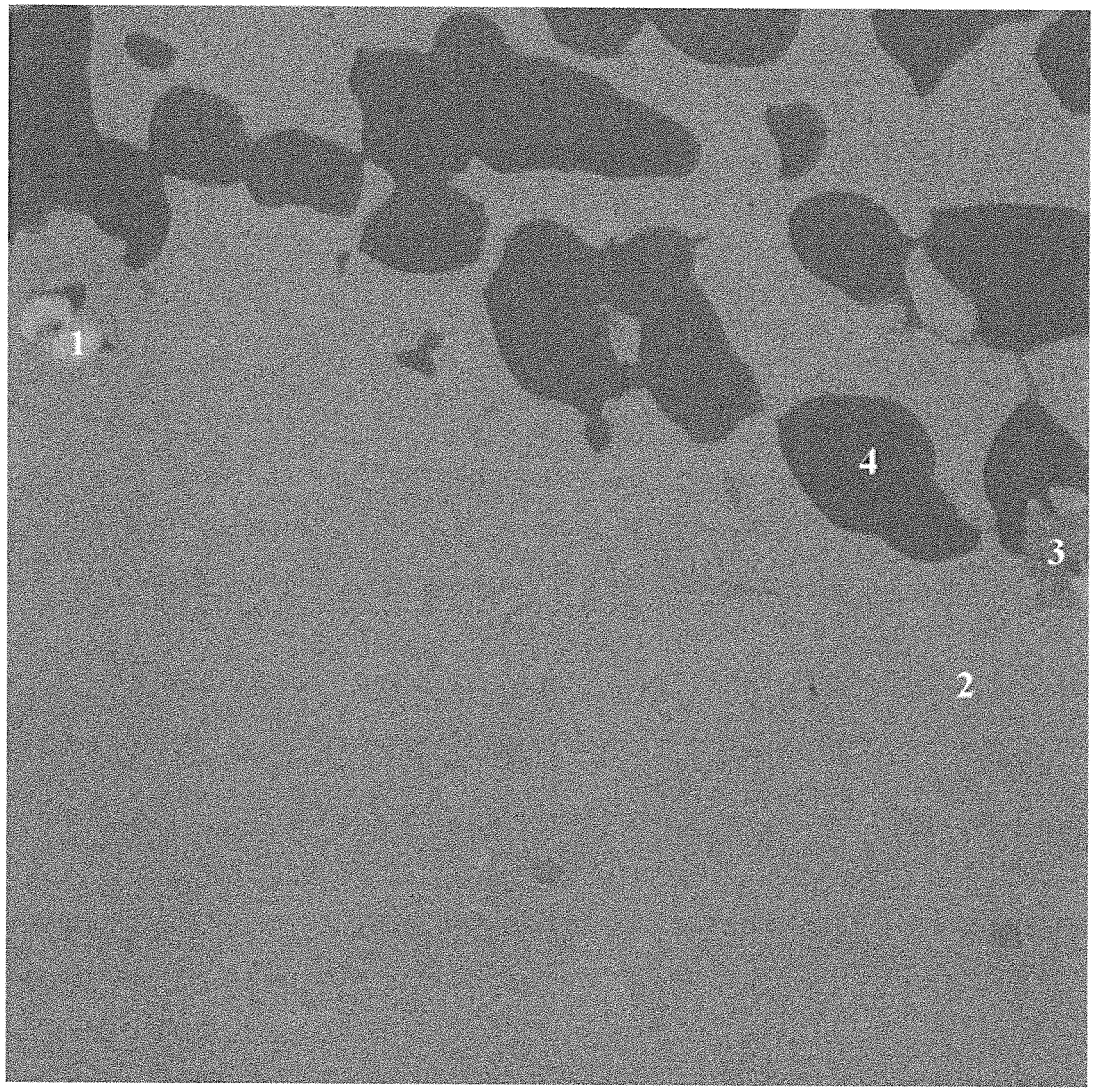
FIG. 4c is a SEM back-scattering electron image from the series of annealed alloys of the present invention.
Figure 4D:
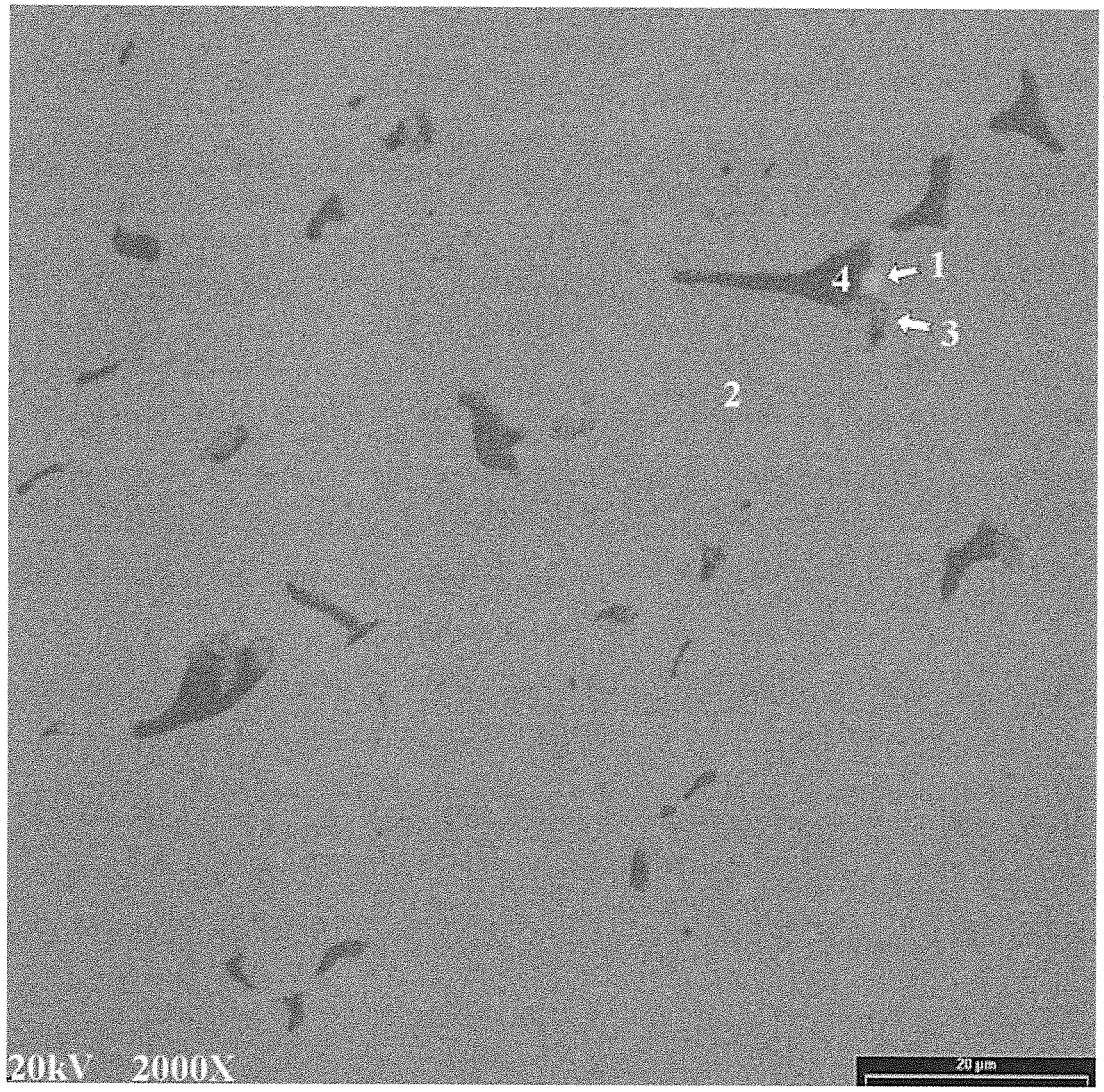
FIG. 4d is a SEM back-scattering electron image from the series of annealed alloys of the present invention.
Figure 4E:
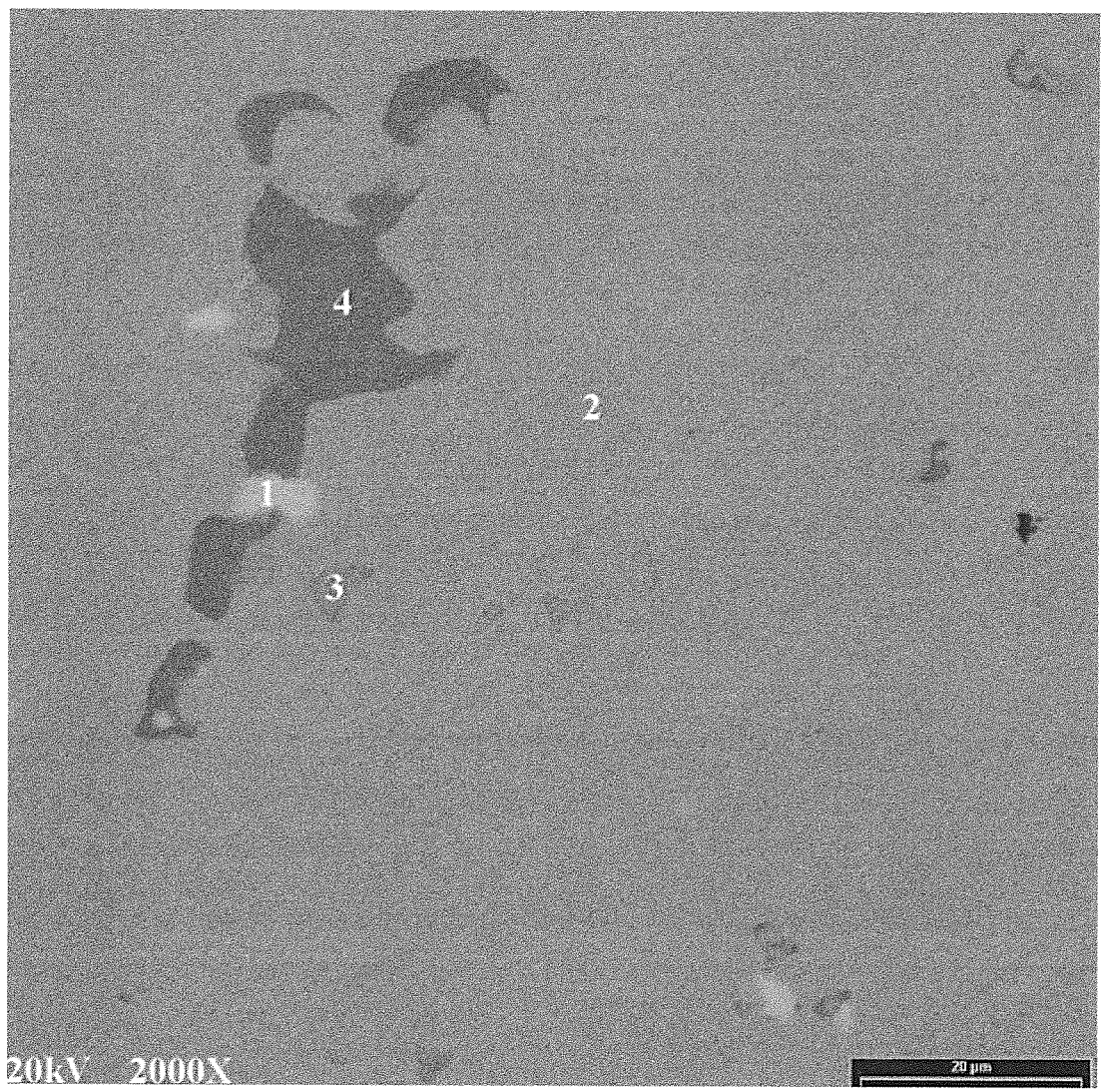
FIG. 4e is a SEM back-scattering electron image from the series of annealed alloys of the present invention.
Figure 4F:
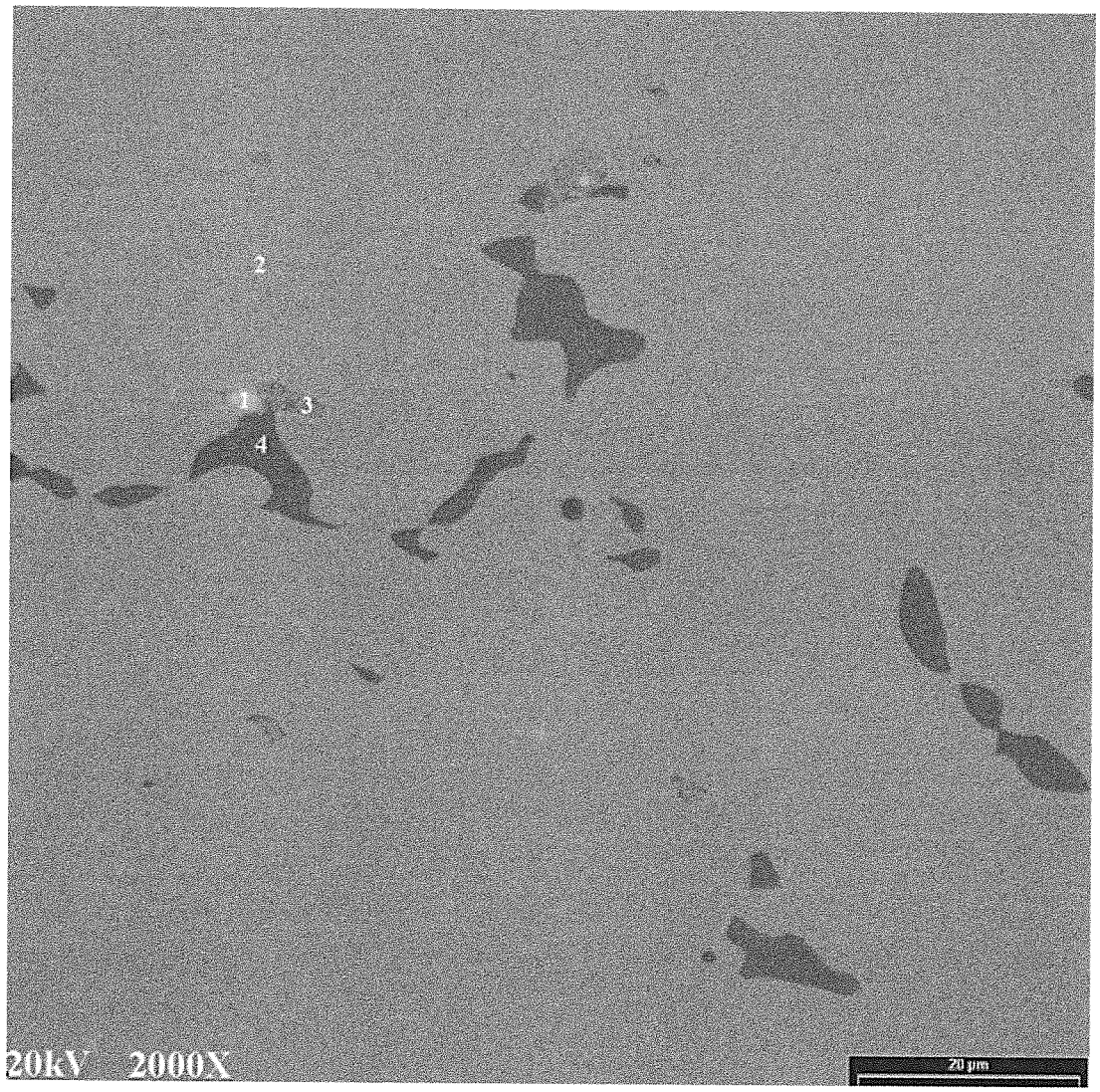
FIG. 4f is a SEM back-scattering electron image from the series of annealed alloys of the present invention.

Lattice constants a and c, c/a ratio, and unit cell volume of the $AB_5$ main phase ($V_{AB5}$) for each alloy are listed in Table 2 and plotted in FIGS. 2a and 2b. As the Ce content in the alloy increases, the a value decreases while the c value remains relatively unchanged in both as-cast and annealed alloys, which is in agreement with previous reports. As a result, the c/a ratio, which is strongly linked to the cycling pulverization rate increases with the increase in Ce content (FIG. 2b). This anisotropic shrinkage of the unit cell with increasing Ce content in the A site is attributed to the multi-valence nature of Ce in $AB_5$ crystal structure. The data indicate that annealing decreases a (−0.1 to −0.3%) and slightly increases c (<0.2%), giving rise to a higher c/a ratio (+0.2 to +0.4%) and a smaller unit cell volume (−0.1 to −0.5%) of the $AB_5$ phase. The trend in c/a ratio suggests that an annealed alloy with a higher Ce content will undergo lower degree of pulverization during hydride/dehydride cycling. The c/a ratios of the alloys in this study are higher than that of a typical misch metal based $AB_5$ MH alloy with 0.2 at. % Zr (c/a=0.8078), which can be attributed to the combination of Zr, Si incorporation, and hyper-stoichiometry in the alloys. The $AB_5$ unit cell volume decreases with the increase in Ce content (FIG. 2b), which promotes a less stable hydride due to a higher plateau pressure. The vertical lines between 30° and 40° in FIGS. 1a and 1b clearly show the shift of the diffraction peak into higher angles with the increase in Ce content, indicating smaller lattice constants and the resulting unit cell shrinkage. The crystallite sizes estimated from the full-width at half maximum (FWHM) of the $AB_5$ (001) diffraction peak are also listed in Table 2. With the increase in Ce content, the crystallite size increases first and then decreases in the alloys before and after annealing. In general, annealing increases the crystallite size of the main phase from the as-cast counterpart.

(LC06) before annealing while the trend in the annealed samples is just the opposite: the B/A ratio first increases from 5.25 (LC01A) to 5.76 (LC05A) and then decreases to 5.59 (LC06A). The materials of the present invention thus show systematic but opposite changes in stoichiometry of the $AB_5$ main phase with varying Ce/La content. The annealed samples have higher B/A ratios in the $AB_5$ main phase than the as-cast alloys due to the reduction in abun-

TABLE 2

Lattice constants a and c, c/a ratio, lattice volume, full width at half maximum (FWHM) for (001) peak, and corresponding crystallite size of the $AB_5$ main phase from XRD analysis, and lattice constant and abundance of the B2 secondary phase.

| | $AB_5$-a (Å) | $AB_5$-c (Å) | $AB_5$-c/a | $V_{AB5}$ (Å$^3$) | $AB_5$ (001) FWHM (2θ, degree) | $AB_5$ crystallite size (Å) | B2-a (Å) | B2-abundance (%) |
|---|---|---|---|---|---|---|---|---|
| LC01 | 4.996 | 4.052 | 0.8110 | 87.59 | 0.274 | 377 | 5.7572 | 3.6 |
| LC02 | 4.991 | 4.053 | 0.8121 | 87.45 | 0.320 | 306 | 5.7646 | 5.0 |
| LC03 | 4.971 | 4.052 | 0.8151 | 86.71 | 0.226 | 496 | 5.7454 | 6.6 |
| LC04 | 4.970 | 4.053 | 0.8153 | 86.70 | 0.197 | 619 | 5.7562 | 6.9 |
| LC05 | 4.962 | 4.052 | 0.8166 | 86.39 | 0.251 | 426 | 5.7666 | 7.6 |
| LC06 | 4.953 | 4.049 | 0.8176 | 86.01 | 0.288 | 351 | 5.7791 | 8.8 |
| LC01A | 4.983 | 4.055 | 0.8139 | 87.19 | 0.147 | >1000 | 5.7306 | 3.0 |
| LC02A | 4.977 | 4.057 | 0.8152 | 87.02 | 0.151 | >1000 | 5.7470 | 3.5 |
| LC03A | 4.966 | 4.057 | 0.8169 | 86.65 | 0.154 | >1000 | 5.7409 | 4.8 |
| LC04A | 4.962 | 4.057 | 0.8177 | 86.49 | 0.133 | >1000 | 5.7442 | 5.6 |
| LC05A | 4.958 | 4.055 | 0.8179 | 86.33 | 0.165 | 869 | 5.7434 | 6.6 |
| LC06A | 4.945 | 4.057 | 0.8206 | 85.91 | 0.167 | 844 | 5.7417 | 7.9 |

Lattice constant and abundance of the B2 secondary phase of each alloy are also listed in Table 2. Lattice constant a of the B2 phase in each alloy is smaller than the one reported from a $AlMnNi_2$ alloy ($a_o$=5.824 Å). While there is no obvious trend in lattice constant vs. the Ce replacement in the A site, the abundance of B2 increases monotonically with the increase in Ce content. Annealing slightly decreases the B2 lattice constant and reduces the amount of secondary phase by 10 to 30%.

The microstructures for the alloys were studied by Scanning Electron Microscopy (SEM). SEM back-scattering electron images (BEI) from as cast LC01 to LC06 and annealed LC01A to LC06A alloys are shown in FIGS. 3a-f and 4a-f, respectively. In all samples, as cast and annealed, four BEI contrasts can be seen. They are, from the brightest to the darkest, metallic La/Ce inclusion, $AB_5$ main phase, $ZrO_2$ inclusion, and B2 phase.

While the La/Ce and $ZrO_2$ inclusions are commonly seen in Zr-containing $AB_5$ alloys of the prior art, the area associated to the B2 phase without any rare earth element is rare, especially at this high volume percentage (3 to 9 vol. %). The deficiency of Mn and Al ((Mn+Al)<50 at. %), which have larger atomic radii, in the B2 areas may contribute to the relatively smaller lattice constants (5.731 to 5.779 Å) found in the XRD analysis (Table 2) compared to that from a stoichiometric $AlMnNi_2$ alloy ($a_o$=5.824 Å). After annealing, the Ni content slightly increases from between 50.2 and 51.5 at. % to between 51.6 and 55.3 at. %, which is in agreement with the slight reduction in lattice constant due to the substitution of the smaller-sized Ni in place of the larger-sized Mn and Al. Additionally, the grains of the B2 secondary phase grow larger but become fewer in number and less in total volume fraction (Table 2). The density of interface between the main and secondary phases reduces substantially after annealing.

Figure 5A:
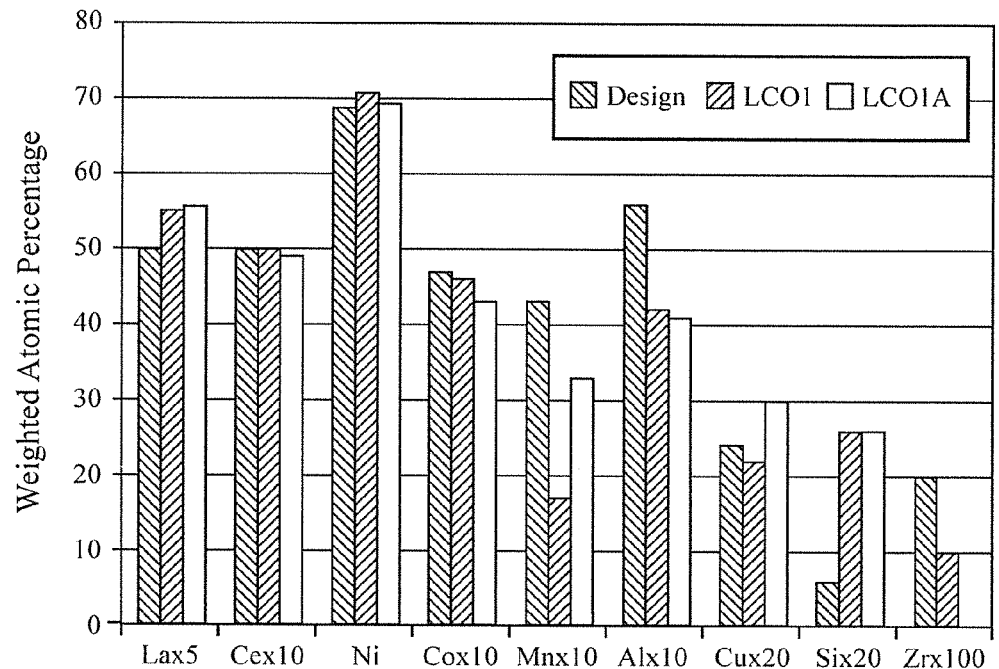
FIG. 5a shows the design and measured atomic percentages of various components of two particular alloys of the present invention in their as-cast state.
Figure 5B:
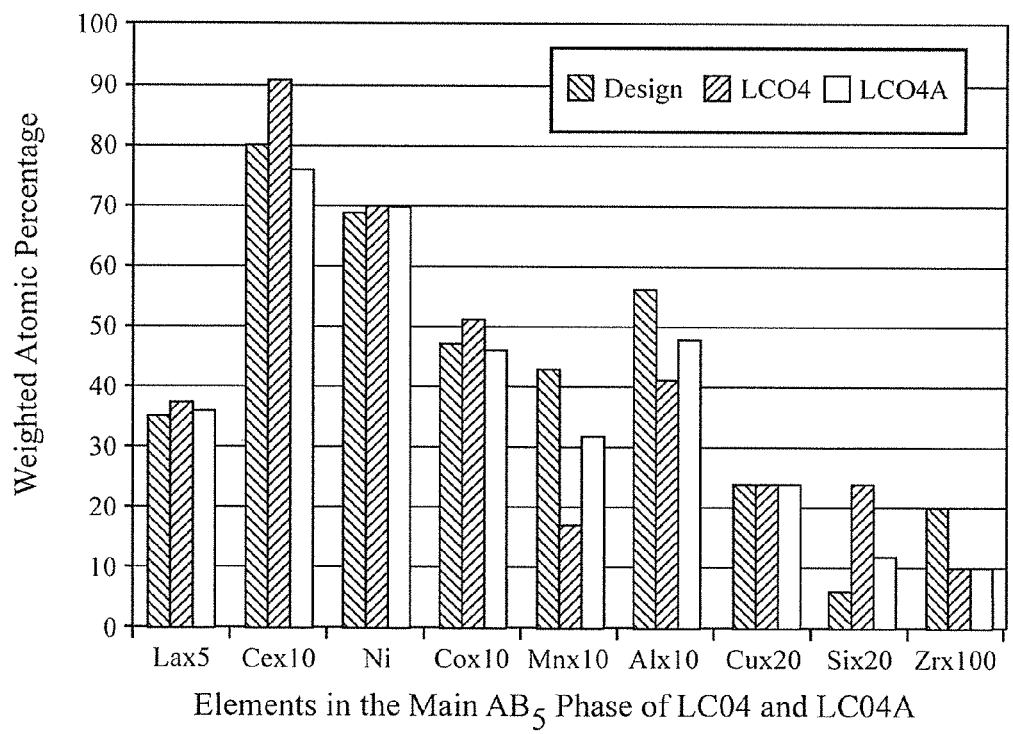
FIG. 5b shows the compositions of these alloys in their as-annealed state.
Figure 6A:
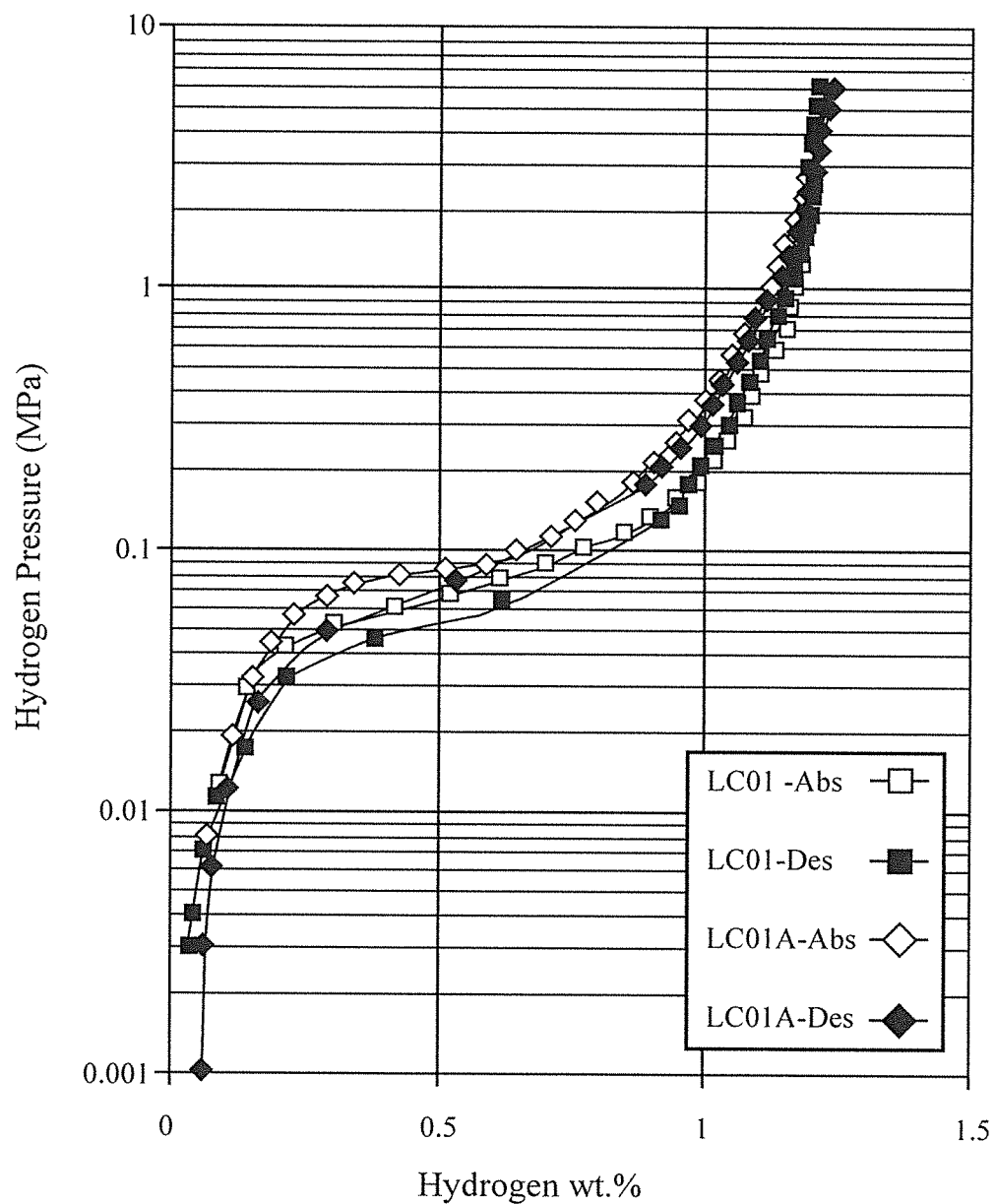
FIG. 6a is a graph showing the hydrogen storage properties of two as-cast alloys of the present invention.
Figure 6B:
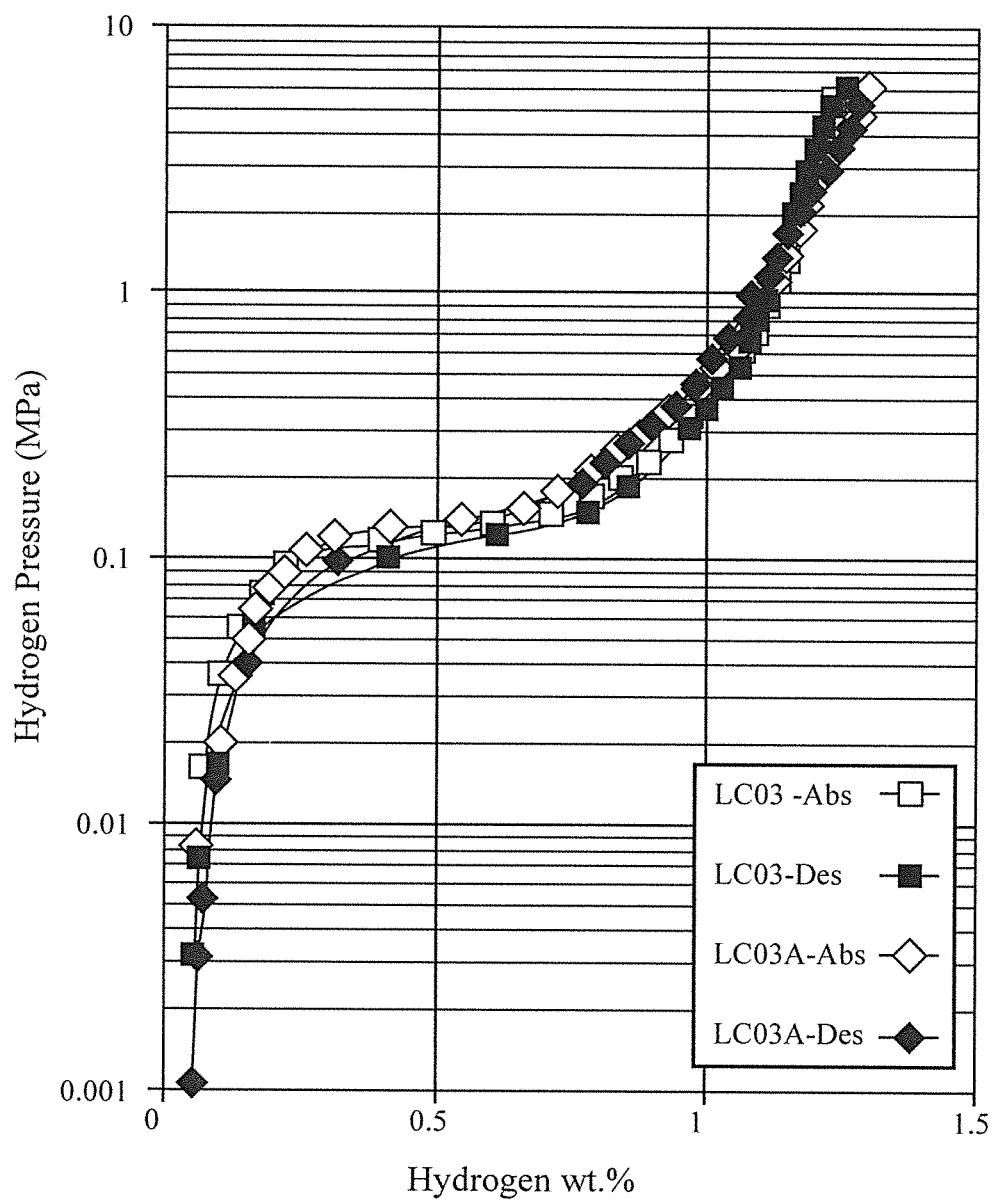
FIG. 6b is a graph showing the hydrogen storage properties of these alloys following annealing.
Figure 6C:
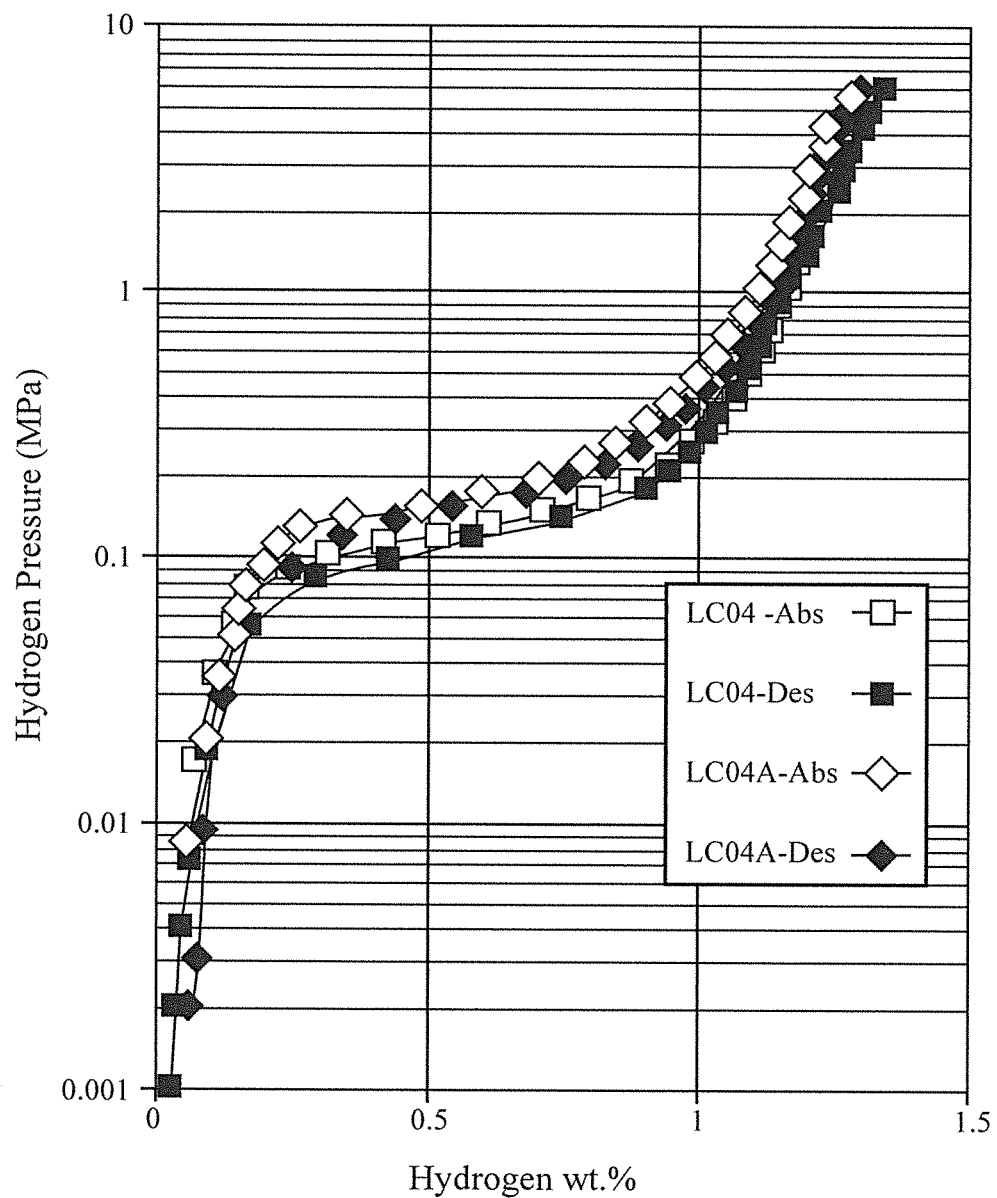
FIG. 6c is a graph showing the hydrogen storage properties of two other as-cast alloys of the present invention.
Figure 6D:
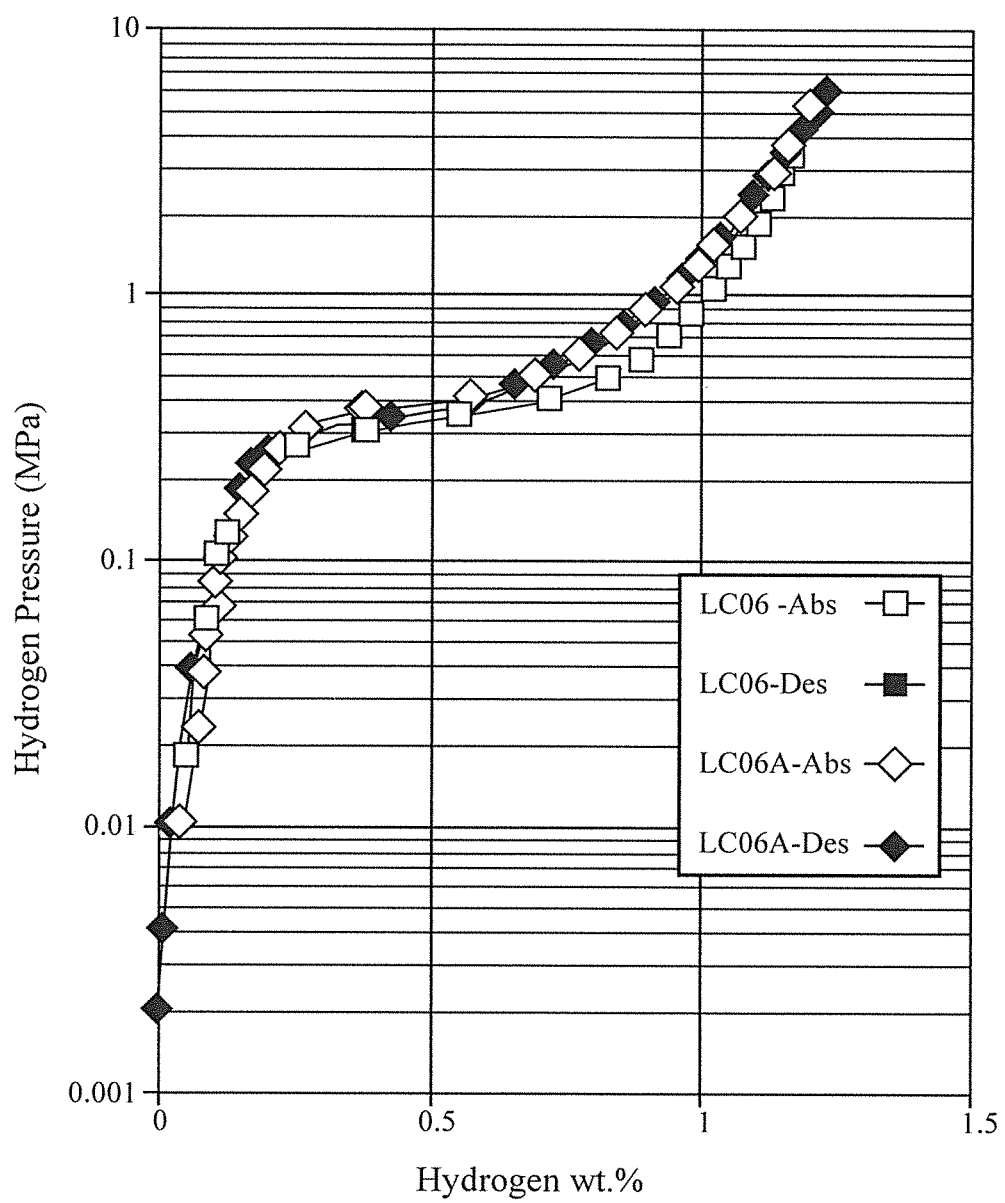
FIG. 6d is a graph showing the hydrogen storage properties of these two other alloys following annealing.

With the increase in Ce content, in the materials of the present invention, the B/A stoichiometric ratio of the $AB_5$ main phase (highlighted in bold in Table 3) first decreases from 5.24 (LC01) to 4.99 (LC03) and then increases to 5.34 dance of the B2 phase, which consists of mainly Ni, Al, and Mn (all B-site elements in the $AB_5$ phase). When comparing the compositions of the $AB_5$ main phase with the design values, the largest deviations were found in Mn and Al contents due to the formation of the $AlMnNi_2$ phase. While the Mn and Al contents in the $AB_5$ main phase of the as-cast samples show wider ranges (1.7 to 2.8 at. % and 4.1 to 6.1 at. %, respectively), they are more consistent in the annealed samples (Mn and Al contents are 3.3 to 4.8 at. % and 4.0 to 4.8 at. %, respectively), indicating that annealing effectively improves the composition homogeneity of the $AB_5$ main phase. The deviations in composition of the $AB_5$ main phase before and after annealing from the original design value of alloy LC01 and LC04 are illustrated in FIGS. 5a and 5b, respectively, as examples. Large deviations in Mn, Al, and Si contents can be seen and attributed to the formation of the Al- and Mn-rich B2 phase that contains only 0.1 to 0.2 at. % Si.

Gaseous hydrogen storage properties of the alloys were studied by PCT measured at 20, 30, and 60° C. As examples, the absorption and desorption isotherms measured at 20° C. of LC01, LC01A, LC03, LC03A, LC04, LC04A, LC06, and LC06A are shown in FIGS. 6a-d. When comparing the isotherms of the as-cast alloys in this study to that of the commercially available $AB_5$ MH alloy, a major difference in flatness of the plateau region is observed. In general, the unannealed $AB_5$ alloys of the prior art show much more slanted PCT isotherm plateau and require annealing to flatten it by improving the chemical composition homogeneity. In this study, the flat plateau region found in the as-cast alloys is believed to be strongly related to the existence of the B2 secondary phase. The chemical compositions in the as-cast alloys are not uniform due to the formation of the B2 secondary phase. Therefore, the reason that the existence of a secondary phase can flatten the PCT isotherm plateau might be associated to its capability to homogenize the metal-hydrogen bond strength of the main $AB_5$ phase through the synergetic effect between the main storage and secondary catalytic phases.

The information obtained from the PCT study is summarized in Table 4. In the first data column, the plateau pressure, defined as the desorption pressure at 0.6 wt. % storage capacity and 20° C., for each alloy is listed. The plateau pressure increases as the Ce content increases in both as-cast and annealed series of alloys. Annealing also increases the plateau pressure. These two findings are in agreement with the $AB_5$ unit cell shrinkage resulted from either the increase in Ce content or annealing. The slope factors (SF), defined as the ratio of the storage capacity between 0.01 and 0.5 MPa hydrogen pressure to the total capacity, were calculated in earlier studies with B-site element substitutions in $AB_5$ alloys and used to determine the degree of disorder in the alloys. In this study, since the controlling factor is the composition of the A-site elements (La/Ce), which has a large impact on the equilibrium pressure, the previous definition of SF with a fixed pressure range is no longer applicable. Therefore, a new definition of SF is adopted $-\ln(P_{80\%}/P_{20\%})$, where $P_{80\%}$ and $P_{20\%}$ are the desorption pressures corresponded to 80 and 20% of the total capacity, respectively. Higher SF value indicates a more tilted isotherm plateau. The newly defined SF for each alloy is listed in the second data column of Table 4. In both as-cast and annealed series of alloys, SF first increases and then decreases, which implies that the isotherm plateau first becomes more tilted and then flatter with the increase in Ce content. Generally speaking, annealing increases SF, which is equivalent to a more tilted isotherm plateau. This finding is opposite to the understanding gathered from comparing regular stoichiometric $AB_5$ MH alloys before and after annealing. On the other hand, it further verifies the positive effect of the B2 secondary phase on increasing the homogeneity in the alloy. More specifically, the increase in slope of PCT isotherm plateau by annealing is the consequence of the reductions in both B2 phase abundance and main/secondary phase interface density (as seen from the enlarged crystallite in Table 2).

XRD analysis and can be attributed to the combination of the additions of Si and Zr and the adoption of hyper-stoichiometry.

The maximum and reversible gaseous phase hydrogen storage capacities are listed in the fourth and fifth data columns of Table 4, respectively. Both capacities increase first and then decrease for both the as-cast and annealed series of alloys. In general, both maximum and reversible gaseous phase hydrogen capacities increase after annealing due to the increase in main storage phase. The storage capacity is supposed to decrease due to the $AB_5$ unit cell shrinkage as the Ce content increases. However, the opposite driving force that increases the capacity is present due to the increase in B2 secondary phase, which can serve as a catalyst through the same synergetic effect as reported in the case of $AB_2$ MH alloys. Therefore, the net effects on the storage capacity are mixed with the increase in Ce content.

Figure 7:
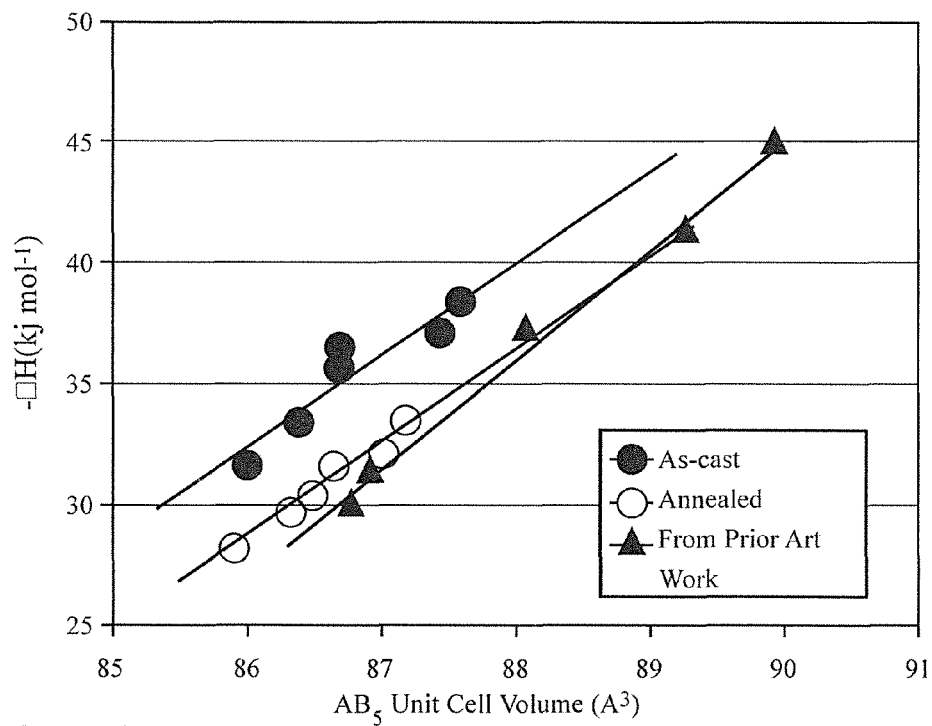
FIG. 7 is a graph showing hydride stability of as-cast and as-annealed materials of the present invention as a function of unit cell volume, together with comparative data from the prior art.

Desorption equilibrium pressures at 0.6 wt. % storage capacity measured at 20, 40, and 60° C. were used to calculate the changes in enthalpy ($\Delta H$) and entropy ($\Delta S$) by the equation $$\Delta G = \Delta H - T\Delta S = RT \ln P \qquad (1)$$

where R is the ideal gas constant and T is the absolute temperature. The results of these calculations are listed in the sixth and seventh data columns of Table 4. Both increasing the Ce content and annealing increase $\Delta H$ (less negative) and consequently promotes a less stable hydride, which agrees with the $AB_5$ unit cell shrinkage. FIG. 7 shows a plot of $-\Delta H$ against $V_{AB5}$. It is interesting to observe that although both the as-cast and annealed series of alloys exhibit linear dependency between $-\Delta H$ and $V_{AB5}$, these two lines are almost in parallel but do not align. In FIG. 7, the line from the annealed samples is below that from the as-cast ones, which indicates that the hydride from the annealed alloy is less stable (less negative $\Delta H$) than that from the as-cast alloy with comparable $AB_5$ unit cell volume. A third

TABLE 4

Summary of gaseous phase properties (plateau pressure, slope factor, hysteresis, maximum capacity, reversible capacity, heat of hydride formation, and entropy) and results from half-cell measurement (Full capacity, high-rate capacity, and high-rate dischargeability).

| | Des. pressure @ 0.6%, 20° C. MPa | Slope factor @ 20° C. | PCT hysteresis @ 0.6%, 20° C. | Max. cap. @ 20° C. wt. % | Rev. cap. @ 20° C. wt. % | $-\Delta H$ kJ mol$^{-1}$ | $-\Delta S$ J mol$^{-1}$ K$^{-1}$ | Cap. @ 400 mA g$^{-1}$ mAh g$^{-1}$ | Cap. @ 50 mA g$^{-1}$ mAh g$^{-1}$ | HRD |
|---|---|---|---|---|---|---|---|---|---|---|
| LC01 | 0.061 | 1.68 | 0.21 | 1.22 | 1.17 | 38.4 | 125 | 284 | 289 | 0.98 |
| LC02 | 0.079 | 1.69 | 0.03 | 1.24 | 1.20 | 37.1 | 125 | 301 | 304 | 0.99 |
| LC03 | 0.118 | 1.72 | 0.09 | 1.26 | 1.20 | 36.5 | 124 | 287 | 296 | 0.97 |
| LC04 | 0.120 | 1.79 | 0.11 | 1.35 | 1.20 | 35.6 | 123 | 273 | 278 | 0.98 |
| LC05 | 0.175 | 1.38 | 0.08 | 1.27 | 1.24 | 33.4 | 120 | 244 | 249 | 0.98 |
| LC06 | 0.329 | 1.17 | 0.10 | 1.22 | 1.23 | 31.6 | 118 | 215 | 220 | 0.98 |
| LC01A | 0.093 | 1.98 | 0.05 | 1.24 | 1.18 | 33.5 | 112 | 163 | 242 | 0.67 |
| LC02A | 0.101 | 2.26 | 0.09 | 1.33 | 1.24 | 32.1 | 110 | 160 | 228 | 0.70 |
| LC03A | 0.151 | 2.18 | 0.03 | 1.31 | 1.25 | 31.6 | 109 | 176 | 242 | 0.73 |
| LC04A | 0.157 | 1.64 | 0.08 | 1.30 | 1.22 | 30.4 | 108 | 163 | 222 | 0.73 |
| LC05A | 0.221 | 1.64 | 0.06 | 1.24 | 1.22 | 29.7 | 108 | 149 | 203 | 0.73 |
| LC06A | 0.408 | 1.50 | 0.05 | 1.24 | 1.22 | 28.2 | 108 | 142 | 166 | 0.86 |

The hysteresis of the PCT isotherm, listed in the third data column of Table 4, is defined as $\ln(P_a/P_d)$, where $P_a$ and $P_d$ are the absorption and desorption equilibrium pressures at 0.6 wt. % storage capacity, respectively. The hysteresis is used to predict the pulverization rate during cycling and has a strong correlation to the c/a ratio in $AB_5$-based alloys. The hystereses of all alloys except LC01 are very small, therefore long cycle stability is expected for the alloys. This result agrees with the exceptionally larger c/a ratio found in the set of data from a study on the unannealed $LaNi_{5-x}Al_x$ alloys is added in FIG. 7 for comparison and shows a similar trend to the one obtained from the annealed series in the current study. However, the trend in the as-cast series does not match the other two. The choice of $AB_5$ unit cell volume as the x-axis in FIG. 7 eliminates the $AB_5$ unit cell shrinkage after annealing as a factor, which leaves the B2 secondary phase being the cause of the shift in trend. Both the B2 phase abundance and the main/secondary phase interface density decrease after annealing (as seen from the growths of the secondary phase size and the main phase crystallite size), thus the catalytic assistance from B2 is reduced, the hydrogen storage capability of the main phase is worsened, and consequently ΔH is increased (less negative). Although the hydride is less stable (higher ΔH) after annealing, the gaseous phase hydrogen storage increases due to the increase in $AB_5$ main phase abundance.

ΔS increases with the increase in Ce content in the as-cast and annealed series of alloys. Different from La, Ce has two oxidation states (3+ and 4+), which alters the size of hydrogen storage sites and increases the entropy of the hydride. After annealing, the ΔS value increases (less negative) and deviates more from the value obtained between the hydrogen gas and hydrogen in the solid ($-120$ J K$^{-1}$ mol$^{-1}$) implying a less ordered β hydride phase. This finding is consistent with the higher SF (more tilted isotherm plateau) observed from the alloys after annealing and can be related to the reduction in synergetic effect from the secondary phase, which causes an increase in inhomogeneity in metal-hydrogen bond strength.

Figure 8A:
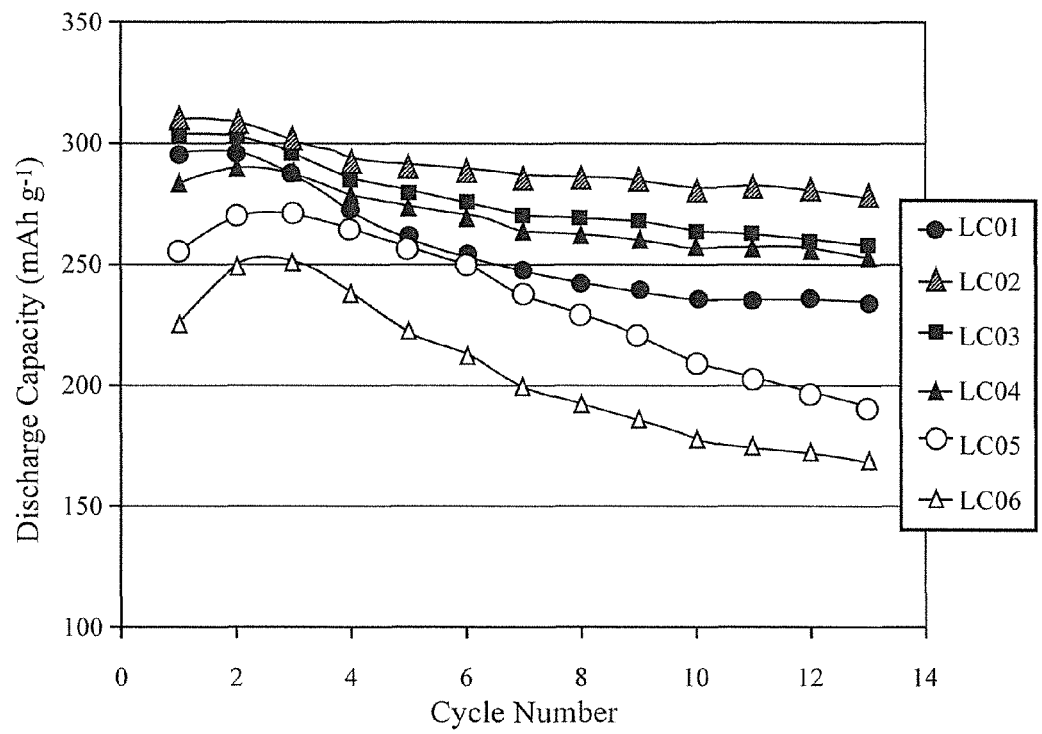
FIG. 8a is a graph showing discharge capacity as a function of cycle number for a series of as-cast alloys of the present invention.
Figure 8B:
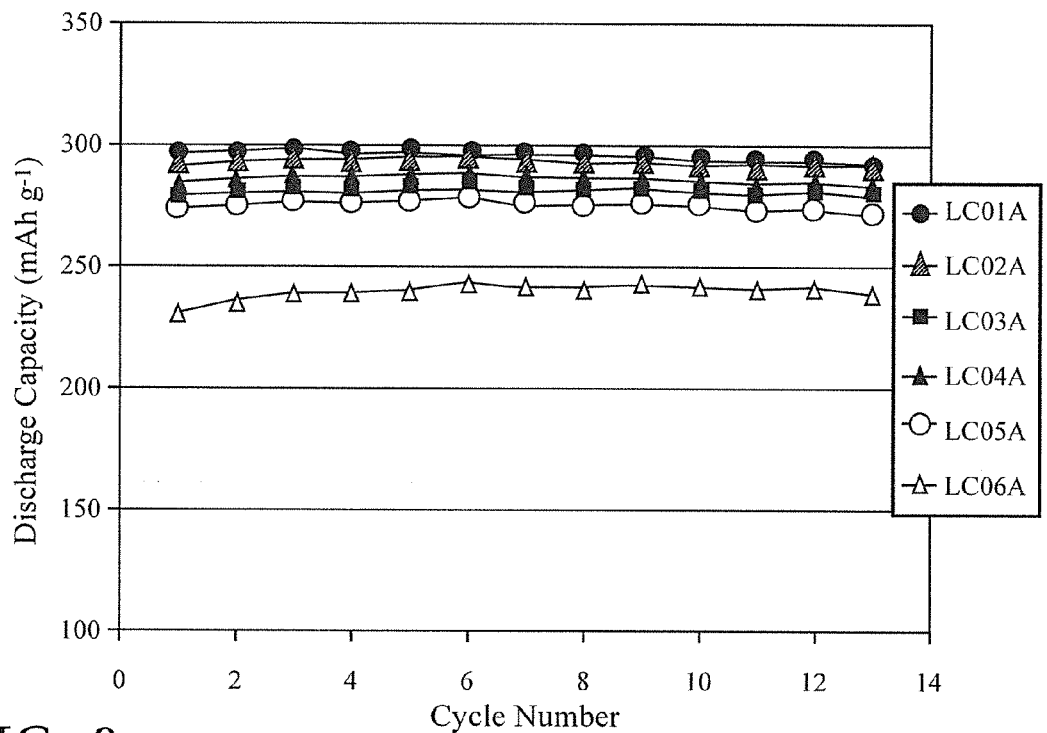
FIG. 8b is a graph of discharge capacity versus cycle number for the corresponding as-annealed alloys.
Figure 9:
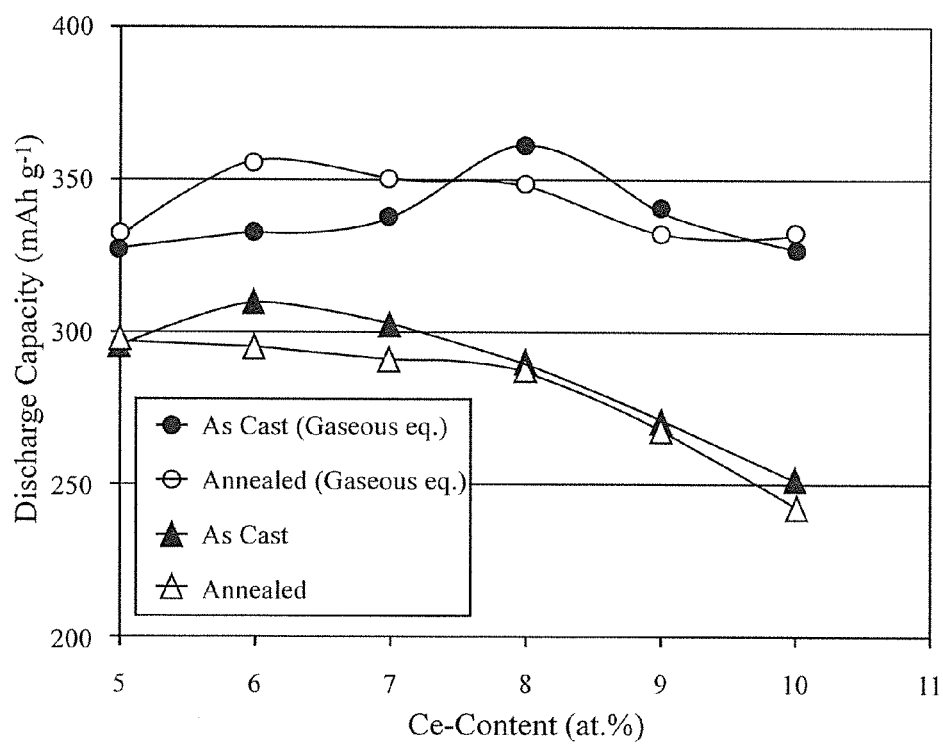
FIG. 9 is a graph showing discharge capacity and equivalent gaseous capacity for a series of alloys of the present invention in an as-cast and annealed state.

The electrochemical properties of these alloys of the present invention were evaluated, and in this regard, activation behaviors and early cycle life performances of both the as-cast and annealed series of alloys were studied in a flooded-cell configuration against a partially pre-charged Ni(OH)$_2$ counter electrode as the positive electrode. Unlike AB) alloys, pre-activation in a hot alkaline solution was not necessary. The full discharge capacities of the first 13 cycles measured with a current density of 12 mA g$^{-1}$ are plotted in FIGS. 8a and 8b for the as-cast and annealed samples, respectively. While capacity degradation is obvious for the as-cast samples, the annealed samples show much more improved cycle stability. Activation is easy for most of the alloys. Only alloys with relatively higher Ce contents (LC04, LC05, LC06, and LC06A) need more than one cycle to reach the full capacity. The full electrochemical discharge capacities together with the equivalent capacities converted from the maximum gaseous phase hydrogen storage capacities (1 wt. %=268 mAh g$^{-1}$) for both the as-cast and annealed samples are plotted as functions of Ce content in FIG. 9. The gaseous phase capacity acts as the upper limit of the electrochemical capacity as in many other MH alloys.

In the as-cast series, the evolution of the full electrochemical discharge capacity vs. Ce content is similar to that of the maximum gaseous phase storage capacity. However, the evolution of the full electrochemical discharge capacity vs. Ce content in the annealed series, which is monotonically decreasing, is different from that of the maximum gaseous phase storage capacity. After annealing, the electrochemical discharge capacity is dominated by the decrease in $AB_5$ unit cell volume with the increase in Ce content as the synergetic effect from the secondary phase becomes less effective.

Figure 10A:
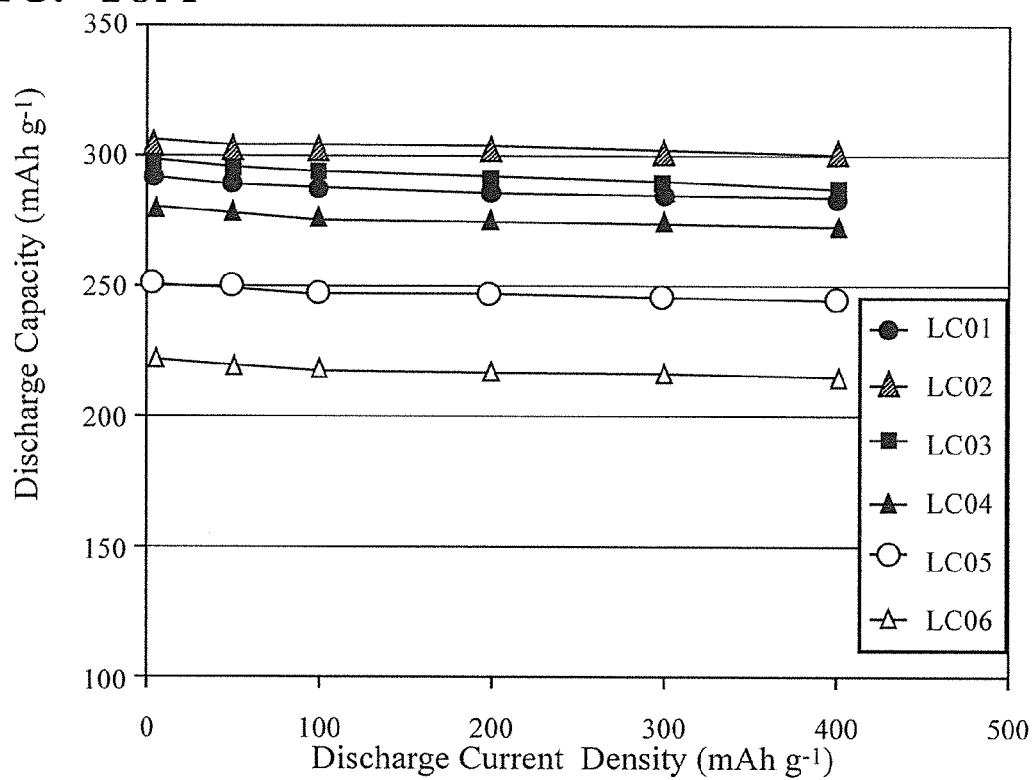
FIG. 10a is a graph showing the high rate discharge capacity of a series of alloys of the present invention in an as-cast state.
Figure 10B:
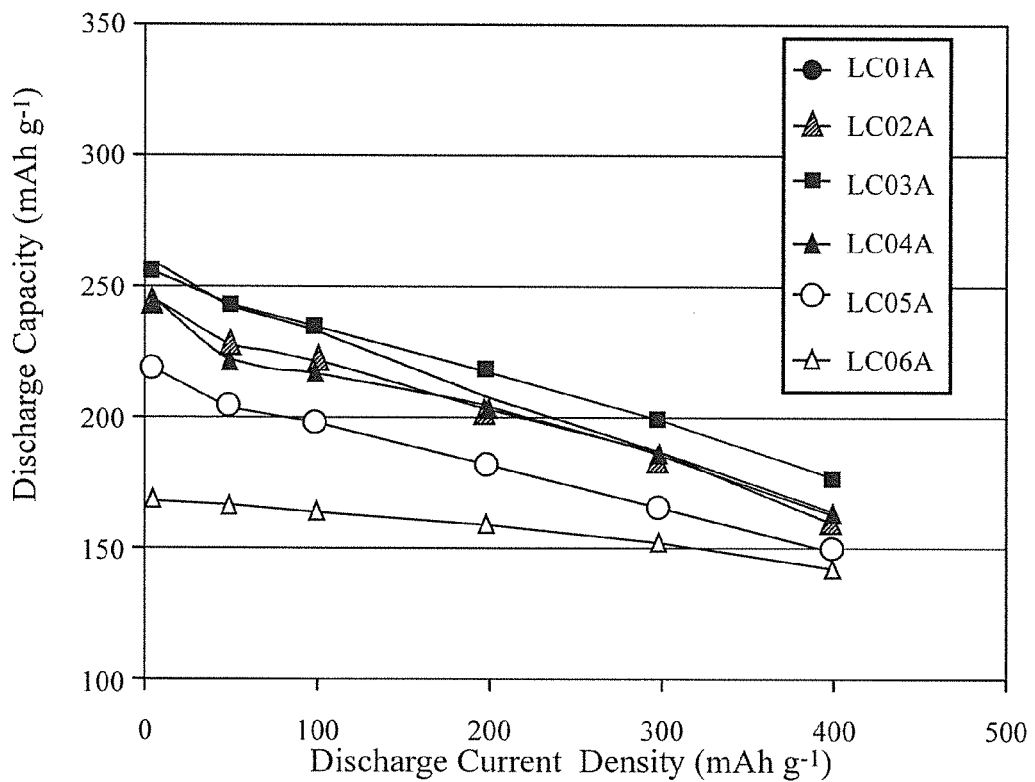
FIG. 10b is a corresponding graph for these alloys in an as-annealed state.

The HRD performance was studied by measuring discharge capacity at the highest rate (400 mA g$^{-1}$) first and followed by different pull current densities in the first cycle. These capacities are plotted against the various discharge rates at FIGS. 10a and 10b. The capacities measured at 400 and 50 mA g$^{-1}$ and the ratio of the two (HRD) for each alloy in this study are listed in the eighth, ninth, and tenth data columns of Table 4, respectively. The HRD ratios from the as-cast samples are similar and higher than those from the annealed samples. HRD in the annealed series increases with the increase in Ce content. Early studies have reported that the HRD ratio is strongly related to the synergetic effect between the main and secondary phases in AB$_2$ MH alloys. It is believed that the same phenomenon is observed in AB$_5$ MH alloys of this study. The main/secondary phase interface density is reduced by annealing and thus the HRD ratio decreases. HRDs of the as-cast sample are close to 1 with small variations among them. In the annealed samples, as the Ce content increases, the abundance of the B2 secondary phase increases (Table 2) and thus the HRD ratio increases.

In order to gain better understanding about the source of the HRD improvement with B2 secondary phase, both the surface exchange current ($I_o$) and the bulk diffusion coefficient (D) were measured electrochemically. The details of both parameters' measurements were previously reported and the values together with data from $AB_2$, $AB_5$, and $A_2B_7$ MH alloys are listed in Table 5. While Is of the alloys in this study are smaller than those from $AB_5$ alloy (except for LC02), Ds are considerably higher than those from other MH alloys. After annealing, both $I_o$ and D reduce, which is consistent with the HRD deterioration. The trends in $I_o$ with increasing Ce content in the as-cast and annealed series are opposite and may be dominated by different factors. The controlling factors for $I_o$ are not clear at present time and require further investigation. In the case of D, the general trends were decreasing for both as-cast and annealed samples with the increase in Ce content. As the Ce content increases, the higher main/secondary phase interface density, plateau pressure, and entropy should contribute positively to D. B2 secondary phase may present as an obstacle to the hydrogen diffusion.

As described above, and as is supported in the experimental series, the multiphase alloy material of the present invention includes a primary $AB_5$ type phase and a secondary phase having a $B_2$ structure. The two phases spontaneously form when the raw material ingredients comprising the alloy are mixed, melted, and cooled. The presence of the secondary phase significantly improves the electrochemical properties of the alloy, such as its charge storage capacity and high-rate discharge capability when incorporated into metal hydride battery systems. It is believed that the secondary phase facilitates transfer of hydrogen into and out of the primary phase. Furthermore, the degree of pulverization of the alloys of the present invention resultant from charging and discharging is minimized, and this may be correlated with better hydrogen transfer owing to the presence of the secondary phase. Some particular materials of the present invention utilize a mixture of La and Ce as the A component of the primary phase, and it is believed that the presence of an appropriate level of Ce aids in modifying the lattice constant of the $AB_5$ main phase, which may correlate with various of the improvements in the performance of the alloys of the present invention.

The foregoing drawings, discussion, description, and experiments illustrate some particular materials of the present invention. In view of the teaching and principles presented herein, yet other variations and modifications thereof will be apparent to those of skill in the art and are encompassed within the scope of the present invention. It is the following claims, including all equivalents, which define the scope of the invention.

The invention claimed is:

1. A rare-earth, nickel based hydrogen storage alloy comprising a primary phase having an $AB_5$ structure and wherein A is one or more rare earth elements, the alloy further including a secondary phase comprising Mn that enhances the electrochemical properties of the alloy by improving at least one of: capacity or high-rate discharge, and wherein the molar ratio of the Mn to the rare earth in the overall alloy composition is 0.26 to 0.29.

2. The alloy of claim 1, wherein said alloy is an $AB_5$ type alloy which is further characterized in that it does not include any Pr or Nd.

3. The alloy of claim 1, wherein B is selected from the group consisting of Al, Si, Sn, transition metals, and combinations thereof, and wherein said alloy contains more than 10 atomic percentage of said one or more rare earth elements.

4. The alloy of claim 1, wherein:
the A component of said primary phase is $La_{1-x}Ce_x$, in which x is greater than 0.33 and less than or equal to 0.66; and the B component of said primary phase includes at least: Ni, Co, Al, and Mn; and
said secondary phase comprises at least: Al, Mn, and Ni.

5. The alloy of claim 4, wherein said secondary phase has a $B_2$ structure.

6. The alloy of claim 4, wherein said B component of said primary phase further includes at least one or more of Cu, Si, or Zr.

7. The alloy of claim 1, wherein said secondary phase comprises, on a volume basis, 1-15% of said alloy.

8. The alloy of claim 1, wherein said secondary phase comprises, on a volume basis, 2-10% of said alloy.

9. The alloy of claim 1, wherein said alloy is characterized in that when the raw materials comprising said alloy are mixed, melted, and allowed to solidify, they spontaneously form said primary and secondary phases.

10. The alloy of claim 1, wherein said alloy is prepared from a bulk mixture comprising: La, Ce, Ni, Co, Mn, Al, Cu, Si, and Zr.

11. A battery system which includes the alloy of claim 1.

12. An alloy comprising:

$$La_{15-x}Ce_xNi_{68.7}Co_{4.7}Mn_{4.3}Al_{5.6}Cu_{1.2}Zr_{0.2}Si_{0.3}$$

wherein x is in the range of 5-10.

13. A rare-earth, nickel based hydrogen storage alloy comprising a primary phase having an $AB_5$ structure and wherein A is one or more rare earth elements, the alloy further including a secondary phase that enhances the electrochemical properties of the alloy by improving at least one of: capacity or high-rate discharge, and wherein particles of said secondary phase comprise a size of 6 micrometers to 30 micrometers.

14. The alloy of claim 13, wherein B is selected from the group consisting of: Al, Si, Sn, transition metals, and combinations thereof, and wherein said alloy contains more than 10 atomic percentage of said one or more rare earth elements.

15. The alloy of claim 13, wherein said secondary phase comprises, on a volume basis, 1-15% of said alloy.

16. The alloy of claim 13, wherein said alloy is prepared from a bulk mixture comprising: La, Ce, Ni, Co, Mn, Al, Cu, Si, and Zr.

* * * * *